US007200180B2

United States Patent
Verbin et al.

(10) Patent No.: US 7,200,180 B2
(45) Date of Patent: *Apr. 3, 2007

(54) DATA TRANSCEIVER WITH FILTERING AND PRECODING

(75) Inventors: Rami Verbin, Tel Aviv (IL); Ilan Reuben, Ramat Gan (IL); Ayelet Shahar-Doron, Modi'in (IL)

(73) Assignee: Tioga Technologies, Inc., San Jose, CA (US)

( * ) Notice: Subject to any disclaimer, the term of this patent is extended or adjusted under 35 U.S.C. 154(b) by 864 days.

This patent is subject to a terminal disclaimer.

(21) Appl. No.: 10/169,266

(22) PCT Filed: Dec. 28, 2000

(86) PCT No.: PCT/IL00/00869

§ 371 (c)(1),
(2), (4) Date: Oct. 8, 2002

(87) PCT Pub. No.: WO01/50645

PCT Pub. Date: Jul. 12, 2001

(65) Prior Publication Data

US 2003/0223505 A1 Dec. 4, 2003

Related U.S. Application Data

(63) Continuation-in-part of application No. 09/637,797, filed on Aug. 11, 2000, now Pat. No. 6,879,639, which is a continuation-in-part of application No. 09/476,747, filed on Dec. 30, 1999, now Pat. No. 6,411,657.

(60) Provisional application No. 60/227,762, filed on Nov. 21, 2000, provisional application No. 60/197,208, filed on Apr. 13, 2000.

(30) Foreign Application Priority Data

Jan. 11, 2001 (DE) .................. 100 00 757

(51) Int. Cl.
*H04L 5/12* (2006.01)
*H04L 25/03* (2006.01)
*H04B 15/00* (2006.01)
*H04K 1/02* (2006.01)
*H05L 25/49* (2006.01)

(52) U.S. Cl. ............ 375/261; 375/285; 375/296; 375/348; 375/350

(58) Field of Classification Search ........... 375/285, 375/296, 348, 350
See application file for complete search history.

(56) References Cited

U.S. PATENT DOCUMENTS 5,249,200 A 9/1993 Chen et al.

(Continued)

*Primary Examiner*—Jay K. Patel
*Assistant Examiner*—Jia Lu
(74) *Attorney, Agent, or Firm*—Townsend and Townsend and Crew LLP

(57) ABSTRACT

A method for conveying digital data from a transmitter (20) to a receiver (40) includes specifying a spectral filtering profile to be applied in conveying the data. A sequence of input symbols is generated (22) at the transmitter, corresponding to the data to be conveyed. The input symbols are precoded at the transmitter using Tomlinson-Harashima precoding (25) responsive to the specified profile, so as to generate a corresponding sequence of precoded symbols. The precoded symbols are filtered (26) in accordance with the specified profile. The precoded and filtered symbols are decoded at the receiver so as to recover the data therefrom.

120 Claims, 11 Drawing Sheets

U.S. PATENT DOCUMENTS

| | | |
|---|---|---|
| 5,293,402 A * | 3/1994 | Crespo et al. ............... 375/233 |
| 5,878,086 A | 3/1999 | Hulyalkar |
| 5,881,108 A | 3/1999 | Herzberg et al. |
| 5,881,363 A | 3/1999 | Ghosh et al. |
| 6,061,407 A * | 5/2000 | Cherubini et al. .......... 375/265 |
| 6,532,267 B1 * | 3/2003 | Heegard ..................... 375/253 |
| 6,597,745 B1 * | 7/2003 | Dowling ..................... 375/296 |
| 6,792,049 B1 * | 9/2004 | Bao et al. ................... 375/285 |
| 6,973,146 B1 * | 12/2005 | Barnette et al. ............ 375/355 |

* cited by examiner

DATA TRANSCEIVER WITH FILTERING AND PRECODING

CROSS-REFERENCE TO RELATED APPLICATIONS

This application is a continuation-in-part of U.S. patent application Ser. No. 09/637,797, filed Aug. 11, 2000, now U.S. Pat. No. 6,879,639 which is a continuation-in-part of U.S. patent application Ser. No. 09/476,747, filed Dec. 30, 1999 now U.S. Pat. No. 6,411,657. This application claims the benefit of the following U.S. Provisional Patent Applications: No. 60/197,208, filed Apr. 13, 2000; No. 60/227,762, filed Aug. 24, 2000; and "Startup Procedure for Efficient Precoding Schemes," filed Nov. 21, 2000. This application is also related to U.S. patent application Ser. No. 09/521,495, filed Mar. 9, 2000. All of these related applications are assigned to the assignee of the present patent application and are incorporated herein by reference.

FIELD OF THE INVENTION

The present invention relates generally to high-speed data communications, and specifically to transmission of Very High Rate Digital Subscriber Line (VDSL) signals.

BACKGROUND OF INVENTION

Digital Subscriber Line (DSL) is a modem technology that enables broadband digital data to be transmitted over twisted-pair wire. DSL modems allow users to access digital networks at speeds tens to hundreds of times faster than current analog modems and basic ISDN service. A range of DSL standards has been defined, known generically as "xDSL," wherein the various standards have different data rates and other associated features but share common principles of operation. VDSL (Very High Rate Digital Subscriber Line) is the next-generation technology in the DSL family, offering data rates up to 52 Mbit/s over short runs.

DSL modems transmit data that has been modulated in accordance with either a single-carrier or a multi-carrier modulation scheme. Single-carrier schemes for VDSL include Quadrature Amplitude Modulation (QAM) and Carrierless Amplitude Modulation (CAP). These schemes are described, for example, by Gitlin et al., in *Data Communications Principles* (Plenum Press, New York, 1992), pp. 334–347, which is incorporated herein by reference. In QAM, input data values are mapped for transmission to a sequence of symbols, each having a certain amplitude and phase. Each symbol can be represented by a complex number, which is a point in a two-dimensional "constellation" of symbols. Data for VDSL transmission may be coded before modulation, using any of a variety of suitable coding schemes known in the art, or may alternatively be uncoded.

DSL transmission channels are often subject to severe inter-symbol interference (ISI), due to amplitude distortion in the frequency domain. The accepted solution to this problem is to use at the receiver a feed forward equalizer (FFE) together with a decision feedback equalizer (DFE), in order to cancel interference from past signals. One of the problems caused by such a DFE is error propagation since once an error has been introduced into one of the samples, the DFE will "remember" the error over many subsequent samples.

If the channel impulse response is known, a suitable Tomlinson-Harashima precoder can be used in the transmitter, and can eliminate the need for the DFE in the receiver. Precoders of this sort are described by Wei, in an article entitled, "Generalized Square and Hexagonal Constellations for Intersymbol-Interference Channels with Generalized Tomlinson-Harashima Precoders," published in *IEEE Transactions on Communications*, 42:9 (September, 1994), pp. 2713–2721, which is incorporated herein by reference. The precoder in this context is intended to compensate for inter-symbol interference caused by a channel having an equivalent discrete-time response expressed as $$1 + \sum_{i=1}^{k} h_i Z^{-i}.$$

The Tomlinson-Harashima precoder comprises a two-dimensional modulo device with a negative feedback loop. The modulo device takes each complex input symbol that it receives, r, into an output symbol s given by:

$$s_i = r_i - k_i \cdot 2L \quad (1)$$

wherein $i=1,2$, giving the real and imaginary parts of s and r; 2L is the modulo value; and $k_i$ is an integer such that $-L \leq s_i < L$. In the feedback loop, the symbols output by the modulo device are filtered by a digital filter having a discrete time response based on the equivalent discrete-time response of the channel, without the zero-order time-domain component. In other words, the filter response in the feedback loop is given by $$\sum_{i=1}^{k} h_i Z^{-i}.$$

The filtered feedback symbols are subtracted from the modulated symbols (whether coded or uncoded) that are input to the precoder for transmission.

In the receiver, the channel-distorted symbols are input to a modulo device, which is identical to that in the precoder. Assuming that the equalizer's response is well-matched to the actual response of the channel, the symbols output by the modulo device in the receiver will be identical, to within the white Gaussian noise added by the channel, to the modulated symbols that were input to the precoder for transmission. The output symbols can then be processed by a decision device or Viterbi decoder, as appropriate, to recover the input data.

U.S. Pat. No. 5,249,200, to Chen et al., whose disclosure is incorporated herein by reference, describes a device and method for combining precoding with symbol-rate spectral shaping. A data transmitter, which transmits signals to a receiver over a transmission channel, includes a Tomlinson precoding unit and a spectral shaping unit. The equivalent channel response is determined and conveyed to the precoding and shaping units, which adjust the spectral properties of the transmitted signals in accordance with the determined channel response. The precoding and shaping units may also be used independently of one another.

A further difficulty in transmitting data over twisted pair cable at DSL rates is that a substantial amount of radio-frequency (RF) radiation is inevitably emitted. It has been found that this emission can cause serious interference with amateur radio transmissions, particularly in the HF range. For this reason, emerging technical specifications for VDSL place strict upper limits on the radiation levels that VDSL systems are allowed to generate in HF bands that are set aside for amateur radio, such as 1.81–2.0 MHz, 3.5–4.0 MHz and other, higher-frequency bands. To meet these requirements, system designers typically add notch filters in the output circuits of their modems to attenuate signals in the forbidden frequency ranges. Such notch filters complicate the design not only of VDSL transmitters, but also of receivers. The VDSL receiver must compensate not only for distortion by the communication channel, but also for the distortion introduced in the transmitter output itself by the notch filters.

The conventional solution to this problem is to use an adaptive equalizer in the receiver, comprising a Decision Feedback Equalizer (DFE) and a Forward Filter Equalizer (FFE). As a rule, both the DFE and FFE comprise finite impulse response (FIR) filters, which typically must have a relatively large number of taps with large coefficients when the notch filters are active. Decision feedback equalization is described, for example, in the above-mentioned book by Gitlin et al., pp. 500–513. The long DFE, with many large coefficients, is undesirable for a number of reasons, including:

Uncertain convergence—conventional equalization schemes may converge very slowly or may not converge at all.

Error propagation—the longer the DFE, the longer will be the error bursts due to error propagation. This problem is exacerbated by the presence of a notch filter, which tends to increase the magnitude of the DFE coefficients.

The equalizer might not converge to its optimal values, resulting in a performance loss, typically on the order of 1 dB. Advanced adaptation methods may decrease this performance loss, but at the cost of significant additional complexity.

An alternative solution is proposed by Laamanen in PCT publication WO 98/48545, whose disclosure is incorporated herein by reference. Laamanen describes a digital transmitter and receiver connected by a channel with a channel response, wherein the transmitter includes a Tomlinson-Harashima precoder. The precoder can be used to compensate for the fixed filter sections of the transmitter and/or of the receiver, as well as for a portion of the distortion caused by the channel response. In the preferred implementation of the precoder described in this publication, the feedback filter has the form of a cascade of smaller feedback blocks, each compensating for a different part of the fixed filter sections or channel response. The receiver includes the FFE part of the equalizer (in the form of a finite impulse response [FIR] filter), but the DFE portion of the equalizer is transferred to the transmitter to form part of the feedback filter chain of the precoder. The receiver then contains only the FFE portion of the equalizer.

SUMMARY OF THE INVENTION

It is an object of some aspects of the present invention to provide an improved high-speed data modem.

It is a further object of some aspects of the present invention to provide methods and apparatus that enable enhanced equalization of spectrally-shaped signals.

In preferred embodiments of the present invention, a high-speed data transmitter transmits signals, based on a stream of input symbols, over a communication channel to a receiver. A specified spectral shaping function is applied to the signals, by either a digital transmit (Tx) filter or a digital receive (Rx) filter, or a combination of the two. The spectral shaping typically includes one or more notches, such as are required for eliminating radio-frequency interference (RFI) due to the transmitter in specified, forbidden frequency bands, or to eliminate RFI from external sources that reaches the receiver. The overall spectral shape of the signal is determined by the Tx and Rx filters, together with the spectral response of the channel.

The transmitter comprises a Tomlinson-Harashima precoder, which precodes the symbols to be transmitted before they are digitally filtered. The precoder comprises a modulo device, as described hereinabove, and a feedback filter having a response that is based on the combined response of the channel and/or Tx and/or Rx filters, less a zero-order time-domain component of the filter response. Preferably, for efficient implementation of the notch profile, the Tx and/or Rx filter comprises an infinite impulse response filter (IIR), and the feedback filter of the precoder similarly comprises an IIR. As a result of the precoding and digital filtering, the symbols reaching the receiver have an expanded output constellation (relative to the input constellation), with a frequency spectrum in accordance with the specified profile.

The receiver comprises an equalizer block and a modulo reduction device. The equalizer block preferably comprises a Forward Filter Equalizer (FEE) and a Decision Feedback Equalizer (DFE), together with a decision device. Alternatively, when the precoder compensates fully for the Tx path, channel and the Rx path, the functionality of the DFE may be fully implemented by the precoder, so that the DFE is not needed. In other cases, a combination of precoding (partial precoder) and a DFE is used.

When the Tomlinson-Harashima precoder is used to compensate only for the distortion due to the notch filtering (or other digital filter response applied to the signal), the FFE and DFE must compensate for channel distortion. Preferably, the FFE and DFE coefficients are determined adaptively, during transmission of an initial test signal from the transmitter to the receiver. The decision device processes the equalized signals to generate symbols having a restored constellation. When the feedback filter of the precoder is based only on the Tx filter response, the restored constellation is substantially the same as the expanded output constellation of the transmitter after filtering the output of the precoder with the filter for which it precodes. The modulo reduction device simply takes a modulo of each of the restored symbols in order to recover the original input symbols.

In some preferred embodiments of the present invention, the Rx and Tx filter coefficients are communicated between the Rx and Tx sides of a modem. This information is useful in setting both sides (Rx and Tx) for optimal operation.

In some preferred embodiments of the present invention, in which the precoder's feedback filter response is based at least in part on the Rx filter, the receiver communicates its filter coefficients to the transmitter in a preliminary phase of communications. Preferably, at the initiation of communications between the transmitter and the receiver, the fixed Tx and Rx filters and the precoder are disabled. The receiver equalizer coefficients are allowed to converge adaptively under these conditions, whereupon the DFE coefficients are conveyed back to the transmitter for implementation by the feedback filter. When this operation is completed, the Tx and Rx filters and the precoder are activated, whereupon the precoder compensates for both the fixed Rx and Tx filters and for the variable channel response.

Alternatively, the Rx and Tx filters need not be activated and deactivated together in this embodiment or in the embodiments described below. Generally speaking, each one of the filters may be used and precoded for separately, or the two of them may be operated together. Furthermore, precoding may be applied to compensate for only part of the fixed Rx and/or Tx path filters.

In some of these preferred embodiments, the fixed filters and the precoder that precodes for their response are activated immediately upon initiation of communications, or at an early stage of communications, after communication of the filter coefficients to the precoder, if the coefficients are not known beforehand. Preferably, the transmitter also communicates its filter coefficients to the receiver to aid in the convergence of its equalizer. The receiver equalizer coefficients are allowed to converge adaptively under these conditions. The DFE coefficients are preferably conveyed back to the transmitter, for implementation in the feedback filter of the precoder, and the DFE is then deactivated. Further alternatively, only one of the fixed Tx and Rx filters is activated initially, together with corresponding feedback in the precoder, and the other is activated subsequently, after adaptation. Still further alternatively, the feedback filter of the precoder is based on only a selected part of the response of the Tx and/or Rx filters. Other variations will be apparent to those skilled in the art.

In others of these preferred embodiments, the Tx path filtering definition is initially conveyed to the receiver, and the precoder is disabled. The DFE in the receiver is configured to compensate for the fixed filters in the Tx path. The transmitter then sends a training sequence to the receiver, which enables the receiver to adjust its equalizer coefficients to compensate for the channel response, as well. Once the DFE coefficients have converged, they are communicated to the transmitter, for use in the precoder. This communication can define either IIR characteristics of the DFE or characteristics of an equivalent long FIR filter response. The DFE is then preferably deactivated, and normal transmission can begin.

Preferably, in the preferred embodiments described above, the DFE and the feedback filter of the precoder comprise IIR filters. Alternatively, the methods of these embodiment are equally applicable using FIR filters. In one such embodiment, the DFE comprises a FIR filter (typically a long filter, with many taps), or for some other reason conveys FIR coefficients, and not IIR coefficients, to the transmitter. Further alternatively, the receiver may translate the characteristics of its long FIR to an IIR equivalent, based on available information regarding the Tx and/or Rx filters. The transmitter preferably translates the FIR coefficients into appropriate IIR coefficients for use in the precoder, based on knowledge of the fixed components in the Rx and Tx paths. Alternatively, the DFE may adapt using an IIR scheme.

In another of these preferred embodiments, only some of the DFE coefficients, preferably the largest of the coefficients, are passed from the receiver to the feedback filter in the transmitter. The DFE continues to operate in the receiver, with coefficients that are modified so that the overall equalization of the received signal is substantially the same as it was before the coefficients were passed to the transmitter.

In some preferred embodiments of the present invention, a novel structure is provided for the transmitter, wherein a single digital filter is used as both the feedback filter of the precoder and the fixed Tx filter. Typically, this fixed filter comprises a notch filter. The output of the feedback filter is simultaneously fed back to the input of the modulo device of the precoder and is added to the output of the precoder. Thus, in essence, a simple adder takes the place of the Tx filter found in transmitters known in the art, such as that described in the above-mentioned PCT publication WO 98/48545. This economical implementation of the transmitter can be used regardless of whether the feedback filter precodes only for the Tx filter response or whether it precodes for one or both of the fixed Rx filter response and the variable channel response.

Thus, in preferred embodiments of the present invention, the Tomlinson-Harashima precoder is used in a novel fashion, to efficiently precode a signal that is subject to known filtering elements. As a result of this precoding, there is no need for the DFE in the receiver to compensate for the effects of the notch filters or other shaping that must be imposed on the transmitted signal. In those preferred embodiments in which the DFE is turned off entirely, the modulo devices in the transmitter and the receiver work in concord to eliminate the deleterious effects of both the filter and the channel.

Transmitters and receivers in accordance with preferred embodiments of the present invention thus have the following advantages:

Lower sensitivity to error propagation, since the most dispersive elements involved in the transmission are precoded.

Lower complexity, taking advantage of the known characteristics of the fixed filters. The precoder (like the notch filter) can thus be implemented with a very efficient IIR scheme, whereas precoders known in the art normally require FIR schemes with much greater complexity.

When the DFE is trained while the notch filters are precoded, better and easier convergence of the DFE is expected since the fixed filters are precoded, and the DFE does not need to take their effect on the total channel response into account.

For combined precoder-DFE schemes (wherein both the precoder and the DFE are active at the same time), there is no need to add taps to the DFE due to the Tx and/or Rx filtering. The result is lower sensitivity to error propagation, in addition to the enhanced convergence of the equalizer.

Simplified pulse shaping (when only the Tx filter is precoded). In most VDSL transmitters, the output of the Tx filter is passed to a pulse shaping filter (typically a square root raised cosine filter). Because the Tx filter output includes the extended constellation points (which is not the case when a conventional Tomlinson-Harashima precoder is used), this output can be represented using only a small number of bits per symbol. Therefore, the pulse shaping filter can be implemented in a very efficient way, using multipliers with a small number of bits. This advantage is significant, since the pulse shaping filter is typically a long FIR filter.

Adaptivity in the mixed precoder-DFE scheme. The precoder can be used to correct for the fixed parts of the total channel response, i.e. for the digital filters at the Rx and Tx sides. The DFE in this case will correct only the time-varying elements of the channel. This configuration solves the adaptation problem of conventional precoders, which are typically used without a DFE.

The present invention is applicable particularly to next-generation, ultra-high speed transmission systems, such as VDSL and standards under development by the HPNA (Home Phone Networking Association). It may, however, be adapted for use in substantially any transmitter/receiver pair that communicate by single-carrier modulation, whether using baseband or passband signal modulation schemes. While preferred embodiments are described herein mainly with reference to notch filtering, a wide range of other digital filter types may be used in the context of the present invention, including both infinite impulse response (IIR) and finite impulse response (FIR) types. The Tomlinson-Harashima precoder and filter of the present invention may also be used in conjunction with an adaptive digital filter for the purpose of "water filling," i.e., to shape the output power spectral density of a transmitter to optimally match the spectral characteristics of the communication channel.

There is therefore provided, in accordance with a preferred embodiment of the present invention, a method for conveying digital data from a transmitter to a receiver, including:

specifying an infinite impulse response (IIR) spectral filtering profile to be applied in conveying the data;

generating a sequence of input symbols at the transmitter corresponding to the data to be conveyed;

precoding the input symbols at the transmitter using Tomlinson-Harashima precoding responsive to the specified profile, so as to generate a corresponding sequence of precoded symbols;

filtering the precoded symbols in accordance with the specified profile;

transmitting the filtered symbols to the receiver; and decoding the filtered symbols at the receiver so as to recover the data therefrom.

Preferably, specifying the spectral filtering profile includes specifying a notch filter to be applied to the precoded symbols, wherein filtering the precoded symbols includes attenuating radio-frequency signals transmitted by the transmitter in a predetermined frequency band, so as to avoid generating radio frequency interference in that band. Alternatively or additionally, filtering the precoded symbols includes attenuating radio-frequency signals received by the receiver in a predetermined frequency band, so as to reject radio frequency interference received in that band.

Preferably, filtering the precoded symbols includes filtering the symbols at the transmitter, wherein filtering the symbols includes filtering the symbols based on predetermined filtering parameters, and including communicating the parameters from the transmitter to the receiver for use in processing the symbols at the receiver. Alternatively or additionally, filtering the precoded symbols includes filtering the symbols at the receiver, wherein filtering the symbols includes filtering the symbols based on predetermined filtering parameters, and including communicating the parameters from the receiver to the transmitter for use in precoding the input symbols.

In a preferred embodiment, generating the sequence of input signals includes generating the sequence with a given input constellation, and filtering the precoded symbols includes generating output symbols having an output constellation that is expanded relative to the input constellation. Preferably, precoding the input symbols includes applying the Tomlinson-Harashima precoding such that each of the input symbols can be recovered by taking a modulo of a corresponding one of the output symbols. Further preferably, generating the sequence of input symbols includes generating symbols having real and imaginary parts, and precoding the input symbols includes precoding both the real and imaginary parts of the input symbols such that both the real and imaginary parts can be recovered by taking a two-dimensional modulo of the real and imaginary parts of the corresponding output symbols. Most preferably, generating the sequence of input symbols includes generating Quadrature Amplitude Modulation (QAM) symbols.

In another preferred embodiment, specifying the IIR spectral filtering profile comprises conveying to the transmitter a definition of a known filter component used in at least one of the transmitter and the receiver, the filter component having poles, and wherein applying the feedback filter response comprises applying the feedback filter response based on the poles of the known filter component.

Preferably, the precoded symbols are conveyed from the transmitter to the receiver over a channel having a channel response, and specifying the spectral profile includes specifying at least a portion of the profile substantially independently of the channel response. In a preferred embodiment, filtering the precoded symbols further includes optimizing a power spectral density of the conveyed precoded symbols responsive to the channel response. Most preferably, the method includes determining the channel response, wherein precoding the input symbols includes using the Tomlinson-Harashima precoding responsive to the channel response, as well as to the specified profile.

Preferably, precoding the input symbols includes:

filtering the sequence of precoded symbols by applying a feedback filter response thereto, so as to generate a corresponding sequence of feedback symbols, wherein the feedback filter response is substantially equal to the filtering profile less a zero-order time-domain component of the profile;

subtracting the feedback symbols from the corresponding input symbols, so as to generate a corresponding sequence of subtracted symbols; and mapping the subtracted symbols to the corresponding precoded symbols, such that each of the subtracted symbols in the sequence can be recovered by taking a modulo of the corresponding precoded symbol.

Preferably, generating the sequence of input symbols includes generating Quadrature Amplitude Modulation (QAM) symbols, having respective real and imaginary parts, and wherein mapping the subtracted symbols includes mapping both real and imaginary parts of the subtracted symbols.

In a preferred embodiment, specifying the spectral filtering profile includes specifying a filter response given in the z-domain by $A(z)/B(z)$, A and B complex polynomials, wherein the precoded symbols are conveyed from the transmitter to the receiver over a channel having a channel response $H(z)$, and wherein applying the feedback filter includes applying a filter with a response $F(z)$ given substantially by $F(z)=[(1+z^{-1} \cdot DFEh(z)) \cdot A(z)-B(z)]/B(z)$, wherein $DFEh(z)$ is an equalizer response of a decision feedback equalizer that is suitable to compensate for the channel response at the receiver. Preferably, decoding the symbols includes adaptively determining the response $DFEh(z)$ at the receiver, and applying the filter with the response $F(z)$ includes conveying an indication of the determined response $DFEh(z)$ to the transmitter for application by the feedback filter.

Additionally or alternatively, specifying the IIR spectral filtering profile includes specifying a transmit filtering profile to be applied by the transmitter, and applying the feedback filter response includes generating interim transmit symbols by applying to the precoded symbols at least a portion of the feedback filter response corresponding to the transmit filtering profile, and filtering the precoded symbols in accordance with the specified profile includes adding the interim transmit symbols to the precoded symbols.

In a preferred embodiment, the transmitter transmits Very High Rate Digital Subscriber Line (VDSL) signals to the receiver based on the sequence of precoded symbols.

Preferably, decoding the symbols at the receiver includes taking a modulo of each of the symbols so as to recover the corresponding input symbol.

There is also provided, in accordance with a preferred embodiment of the present invention, a method for conveying digital data from a transmitter to a receiver, including:

specifying a spectral filtering profile to be applied in conveying the data, including a transmit filtering profile to be applied by the transmitter;

generating a sequence of input symbols at the transmitter corresponding to the data to be conveyed;

precoding the input symbols responsive to the specified profile so as to generate a corresponding sequence of precoded symbols, wherein precoding the input symbols includes:

applying a feedback filter response to the precoded symbols so as to generate a corresponding sequence of feedback symbols, at least a portion of the feedback filter response including a transmit feedback filter response corresponding to the transmit filtering profile, such that interim transmit symbols are generated due to applying the transmit feedback filter response to the precoded symbols;

subtracting the feedback symbols from the corresponding input symbols, so as to generate a corresponding sequence of subtracted symbols; and mapping the subtracted symbols to the corresponding precoded symbols, such that each of the subtracted symbols in the sequence can be recovered by taking a modulo of the corresponding precoded symbol;

adding the precoded symbols to the corresponding interim transmit symbols, so as to generate output symbols that are filtered in accordance with the transmit filtering profile;

transmitting the output symbols to the receiver; and decoding the output symbols at the receiver so as to recover the data therefrom.

In a preferred embodiment, the spectral filtering profile is substantially identical to the transmit filtering profile, such that the interim transmit symbols are the feedback symbols.

In another preferred embodiment, specifying the spectral filter response includes specifying a receive filtering profile to be applied by the receiver, and applying the feedback filter response includes filtering the symbols responsive to the receive filtering profile. Preferably, filtering the symbols includes filtering the symbols based on predetermined filtering parameters, and the method includes communicating the parameters from the receiver to the transmitter for use in precoding the input symbols.

There is additionally provided, in accordance with a preferred embodiment of the present invention, a method for conveying digital data from a transmitter to a receiver, including:

specifying a spectral filtering profile to be applied in conveying the data, including a transmit filtering profile to be applied by the transmitter;

conveying one or more parameters defining the transmit filtering profile from the transmitter to the receiver;

generating a sequence of input symbols at the transmitter corresponding to the data to be conveyed;

filtering the symbols in accordance with the specified profile;

transmitting the filtered symbols to the receiver over a channel having a given channel response;

adaptively determining equalization coefficients for application by a digital equalizer in the receiver responsive to the channel response, using the parameters conveyed from the transmitter;

applying the digital equalizer to the symbols at the receiver so as to compensate for the channel response; and decoding the filtered symbols at the receiver so as to recover the data therefrom.

Preferably, the method includes precoding the input symbols at the transmitter using Tomlinson-Harashima precoding responsive to the specified profile, so as to generate a corresponding sequence of precoded symbols, wherein filtering the symbols includes filtering the precoded symbols. Further preferably, the method includes conveying an indication of the adaptively-determined coefficients to the transmitter, wherein precoding the input symbols includes adjusting the Tomlinson-Harashima precoding responsive to the indication. Still further preferably, decoding the symbols includes at least partially deactivating the digital equalizer after adjusting the precoding. Most preferably, determining the equalization coefficients includes refraining from filtering the precoded symbols while determining the coefficients. Alternatively, determining the equalization coefficients includes determining the coefficients while filtering the precoded symbols.

In a preferred embodiment, generating the sequence of input signals includes generating the sequence with a given input constellation, and wherein filtering the precoded symbols includes generating output symbols having an output constellation that is expanded relative to the input constellation, and wherein adaptively determining the equalization coefficients includes finding a distribution of the output constellation and computing the coefficients responsive to the distribution.

Preferably, applying the digital equalizer includes applying a forward equalizer and a decision feedback equalizer.

Preferably, conveying the one or more parameters includes conveying poles and zeroes of the filtering profile or, alternatively, conveying coefficients of a filter implementing the filtering profile.

There is further provided, in accordance with a preferred embodiment of the present invention, a method for conveying digital data from a transmitter to a receiver, including:

specifying a spectral filtering profile to be applied in conveying the data;

transmitting an initial sequence of symbols from the transmitter to the receiver over a channel having a given channel response;

adaptively determining equalization coefficients for application by a digital equalizer in the receiver responsive to the channel response, as indicated by reception of the initial sequence of the symbols at the receiver;

conveying one or more equalization parameters indicative of the determined equalization coefficients from the receiver to the transmitter;

generating a sequence of input symbols at the transmitter corresponding to the data to be conveyed;

precoding the input symbols at the transmitter using Tomlinson-Harashima precoding responsive to the specified profile and to the parameters conveyed from the receiver, so as to generate a corresponding sequence of precoded symbols;

filtering the precoded symbols in accordance with the specified profile;

transmitting the filtered symbols to the receiver over the channel; and decoding the filtered symbols at the receiver so as to recover the data therefrom.

Preferably, specifying the spectral filtering profile includes specifying a transmit filtering profile to be applied by the transmitter and conveying one or more filtering parameters defining the transmit filtering profile from the transmitter to the receiver for use in adaptively determining the equalization coefficients.

Alternatively or additionally, decoding the symbols includes at least partially deactivating the digital equalizer after conveying the parameters to the transmitter, wherein determining the equalization coefficients includes applying a forward equalizer and a decision feedback equalizer and determining the coefficients therefor, and wherein deactivating the equalizer includes deactivating the decision feedback equalizer.

Preferably, determining the equalization coefficients includes refraining from filtering the precoded symbols while determining the coefficients. Alternatively, determining the equalization coefficients includes determining the coefficients while filtering the precoded symbols.

Preferably, conveying the one or more parameters includes conveying poles and zeroes of a filter used in the equalizer or, alternatively, conveying coefficients of a filter used in the equalizer.

There is moreover provided, in accordance with a preferred embodiment of the present invention, a high-speed data transmitter, including:

a Tomlinson-Harashima precoder, which is adapted to receive and precode a sequence of input symbols responsive to a specified infinite impulse response (IIR) spectral filtering profile, so as to generate a corresponding sequence of precoded symbols; and transmit circuitry, which is adapted to process the precoded symbols so as to generate an output signal for transmission over a communication channel to a receiver.

Preferably, the transmit circuitry is configured to transmit the output signal over a channel having a given channel response, and wherein the precoder is adapted to precode the input symbols responsive to the channel response, as well as to the specified profile.

Preferably, the precoder includes:

a feedback digital filter, which is adapted to apply a feedback filter response, based on the specified spectral filtering profile, to the sequence of precoded symbols so as to generate a corresponding sequence of feedback symbols;

a subtractor, adapted to subtract the feedback symbols from the corresponding input symbols, so as to generate a corresponding sequence of subtracted symbols; and a modulo mapping device, adapted to map the subtracted symbols to the corresponding precoded symbols, such that each of the subtracted symbols in the sequence can be recovered by taking a modulo of the corresponding precoded symbol.

There is furthermore provided, in accordance with a preferred embodiment of the present invention, a high-speed data transmitter, including:

a Tomlinson-Harashima precoder, which is adapted to receive and precode a sequence of input symbols responsive to a specified spectral filtering profile, including a transmit filtering profile to be applied by the transmitter, so as to generate a corresponding sequence of precoded symbols, the precoder including:

a feedback digital filter, which is adapted to apply a feedback filter response, based on the specified spectral filtering profile, to the sequence of precoded symbols so as to generate a corresponding sequence of feedback symbols, at least a portion of the feedback filter response including a transmit feedback filter response corresponding to the transmit filtering profile, such that the filter generates interim transmit symbols by applying the transmit feedback filter response to the precoded symbols;

a subtractor, adapted to subtract the feedback symbols from the corresponding input symbols, so as to generate a corresponding sequence of subtracted symbols; and a modulo mapping device, adapted to map the subtracted symbols to the corresponding precoded symbols, such that each of the subtracted symbols in the sequence can be recovered by taking a modulo of the corresponding precoded symbol; and transmit circuitry, including an adder, coupled to add the interim transmit symbols to the precoded symbols so as to generate the output signal in accordance with the transmit filtering profile for transmission over a communication channel to a receiver.

Preferably, the specified spectral filtering profile includes a notch filter response, and the transmit circuitry requires substantially no digital filter other than the feedback digital filter in order to generate the output signal in accordance with the notch filter response.

Alternatively or additionally, the transmit circuitry is configured to transmit the output signal over a channel having a given channel response, and the precoder is adapted to precode the input symbols responsive to the channel response, as well as to the specified profile. Preferably, the feedback digital filter includes a transmit filter section, which generates the interim transmit symbols, and a channel filter section, which is coupled to generate the feedback symbols, responsive to the channel response, in cooperation with the transmit filter section In a preferred embodiment, the spectral filtering profile is substantially identical to the transmit filtering profile, such that the interim transmit symbols are the feedback symbols.

In another preferred embodiment, the specified spectral filtering profile includes a transmit filtering profile to be applied by the transmitter, and a receive filtering profile to be applied by the receiver, and the feedback digital filter includes a transmit filter section, which generates the interim transmit symbols, and a receive filter section, which is coupled to generate the feedback symbols responsive to the receive filtering profile, in cooperation with the transmit filter section.

Preferably, when the spectral filtering profile is given in the z-domain by $F(z)$, the feedback digital filter is adapted to generate the interim transmit symbols by applying an interim filter response to the precoded symbols that is given substantially by $G(z)=[F(z)-1]/z^{-1}$ There is also provided, in accordance with a preferred embodiment of the present invention, apparatus for high-speed data transmission, including:

a transmitter, which includes:

a Tomlinson-Harashima precoder, which is adapted to receive and precode a sequence of input symbols responsive to a specified spectral filtering profile, so as to generate a corresponding sequence of precoded symbols; and transmit circuitry, which is adapted to process the precoded symbols so as to generate an output signal for transmission over a communication channel; and a receiver, adapted to receive the output signal from the transmitter over the channel, and including:

receive circuitry, which is adapted to process the received output signal, so as to generate a stream of output samples;

a decision block, including a digital equalizer adapted to process the stream of output samples so as to recover a sequence of output symbols, based on information regarding the specified spectral filtering profile exchanged between the transmitter and the receiver; and a modulo reduction device, adapted to take a modulo of each of the recovered output symbols so as to regenerate the input symbols.

Preferably, at least one of the transmit circuitry and the receive circuitry includes a digital filter, which is adapted to apply the specified filtering profile to the signal. Further preferably, the digital filter includes a transmit digital filter in the transmit circuitry and a receive digital filter in the receive circuitry, which are together adapted to apply the specified filtering profile. Most preferably, the digital filter includes a transmit digital filter in the transmit circuitry, the filter having filter parameters, and the transmitter is adapted to transmit the filter parameters to the receiver for use in processing the output samples. Alternatively or additionally, the digital filter includes a receive digital filter in the receive circuitry, the filter having filter parameters, and the receiver is adapted to transmit the filter parameters to the transmitter for use in precoding the input symbols.

Preferably, the precoder includes:

a feedback digital filter, which is adapted to apply a feedback filter response, based on the specified spectral filtering profile, to the sequence of precoded symbols so as to generate a corresponding sequence of feedback symbols;

a subtractor, adapted to subtract the feedback symbols from the corresponding input symbols, so as to generate a corresponding sequence of subtracted symbols; and a modulo mapping device, adapted to map the subtracted symbols to the corresponding precoded symbols, such that each of the subtracted symbols in the sequence can be recovered by taking a modulo of the corresponding precoded symbol.

Further preferably, the decision block includes:

a decision feedback equalizer, which is configured to apply decision feedback filtering to the recovered sequence of output symbols, so as to generate a corresponding sequence of decision feedback symbols;

a forward filter equalizer, which is configured to apply forward equalization to the stream of output samples so as to generate a sequence of forward-equalized symbols;

an adder, adapted to add the decision feedback symbols to the forward-equalized symbols to generate a corresponding sequence of corrected symbols; and an extended slicer, adapted to assign each of the corrected symbols to a corresponding value in a constellation of the output symbols.

Preferably, the decision feedback equalizer includes an adaptive equalizer, having equalization coefficients determined adaptively responsive to the channel response. Further preferably, the receiver is adapted to convey to the transmitter an indication of the equalization coefficients, responsive to which the feedback filter response is determined so that the precoder precodes the input symbols based on the channel response, as well as on the specified profile. Most preferably, after the indication of the equalization coefficients is conveyed to the transmitter, the decision feedback equalizer is at least partially disabled.

Preferably, the equalization coefficients are determined based on the information regarding the specified spectral filtering profile. In a preferred embodiment, the equalization coefficients are determined in a start-up procedure of the apparatus, during which at least a portion of the specified spectral filtering profile is deactivated. In another preferred embodiment, the equalization coefficients are determined in a start-up procedure of the apparatus, during which the precoder is deactivated.

Preferably, the digital equalizer is adapted to process the stream of output samples based on known characteristics of at least a portion of the spectral filtering profile that is applied to the signal by the transmitter or, alternatively or additionally, based on known characteristics of at least a portion of the spectral filtering profile that is applied to the signal by the receiver.

The present invention will be more fully understood from the following detailed description of the preferred embodiments thereof taken together with the drawings in which:

BRIEF DESCRIPTION OF TH DRAWINGS

DETAILED DESCRIPTION OF PREFERRED EMBODIMENTS

Figure 1:
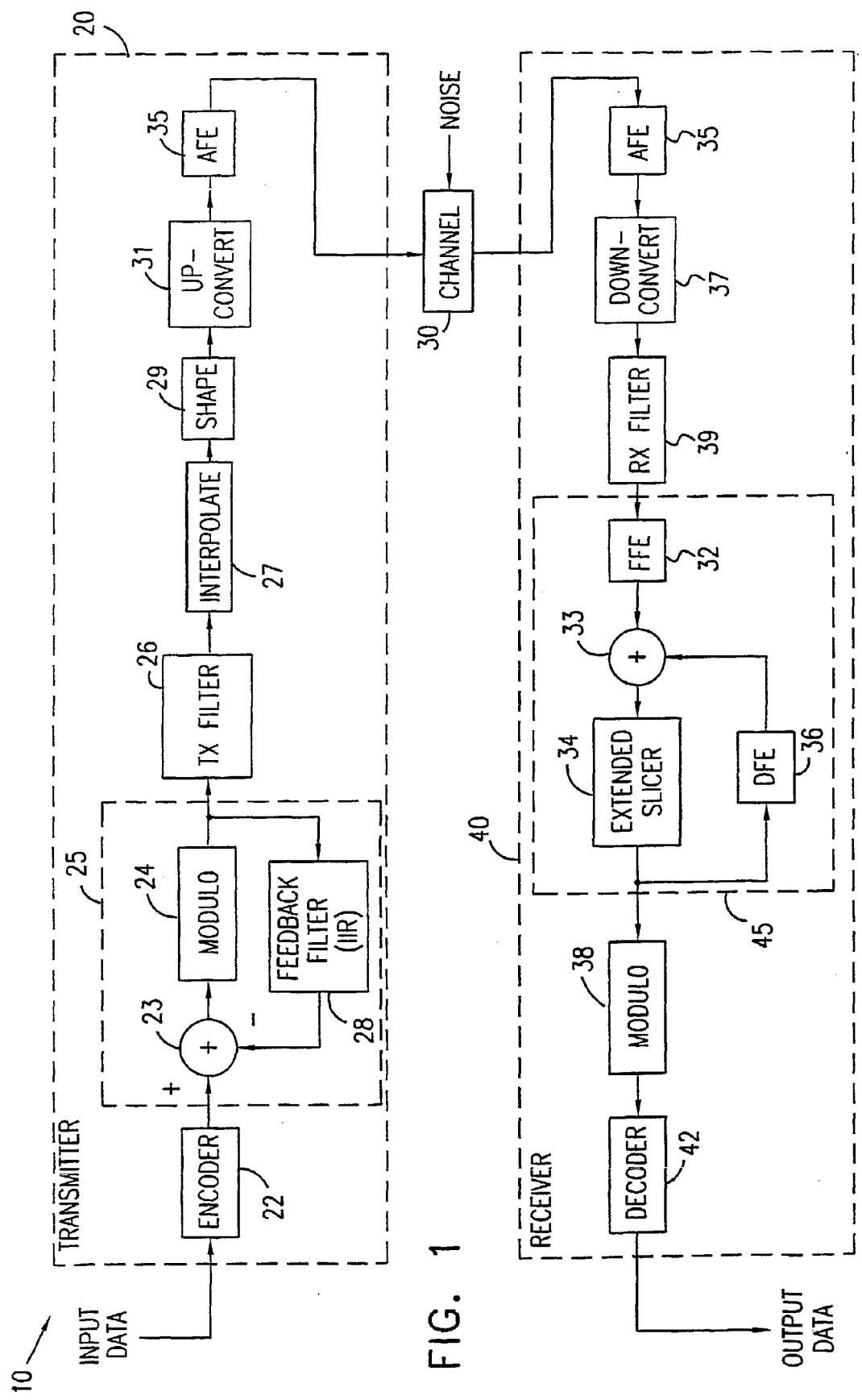
FIG. 1 is a block diagram that schematically illustrates a high-speed data transmitter and receiver, in accordance with a preferred embodiment of the present invention.

FIG. 1 is a block diagram that schematically illustrates a system 10 for high-speed data communications, in accordance with a preferred embodiment of the present invention. The system comprises a transmitter 20 and a receiver 40, linked by a communication channel 30. Preferably, system 10 is a VDSL system, although the principles embodied in the system are similarly applicable to communications in accordance with other standards. In VDSL and other, similar applications, the transmitter and receiver are both parts of respective modems, communicating over a line that includes channel 30. In this case, transmitter 20 is co-located with a receiver, and receiver 40 is similarly co-located with a transmitter. These additional elements are omitted from the figures for the sake of simplicity.

Transmitter 20 comprises a data encoder 22, which receives a stream of digital input data samples from a data source, and generates a corresponding sequence of QAM symbols. Encoder 22 may apply substantially any suitable modulation scheme known in the art including both coded and uncoded schemes.

The symbols generated by encoder 22 are input to a Tomlinson-Harashima precoder 25, which precodes the symbols. Precoder 25 comprises a modulo device 24 and a feedback filter 28. The modulo device preferably operates generally as described in the above-mentioned article by Wei. For square constellations (typical when an even number of bits is used) the modulo operation can be performed separately on the real and imaginary parts of the signal. Preferably, for each input symbol $a_n$, having real and imaginary parts, $a_n^{(1)}$ and $a_n^{(2)}$ respectively, the modulo device generates an output symbol $x_n$ having real and imaginary parts $x_n^{(1)}$ and $x_n^{(2)}$ given by:

$$x_n^{(i)} = a_n^{(i)} \pm b_n^{(i)} \cdot 2M \qquad (2)$$

Here $b_n^{(i)}$ (i=1,2) is a integer number chosen such that $x_n^{(i)}$ is limited to the range (−M,M). For 64 QAM (with a constellation of 64 symbols), for example, M=8. Alternatively, other values of M may be chosen, and different constellation shapes may be used, as described by Wei, for example. Feedback filter 28 applies a feedback filter response, as described in detail hereinbelow, to the symbols output by modulo device 24. Filter 28 is connected to modulo device 24 in a negative feedback loop by an adder 23.

The precoded symbols are preferably filtered by a transmit (Tx) digital filter 26, operating in cooperation with precoder 25. As a result of the precoding, the constellation of the symbols received at the receiver is expanded relative to the input constellation generated by encoder 22 (assuming the precoder precodes only for Tx filter 26). An exemplary expanded constellation of this sort is shown and described hereinbelow. When feedback filter 28 is based only on Tx filter 26, this expanded constellation is identical to that generated at the output of Tx filter 26.

Following precoder 25, transmitter 20 includes further processing and output circuits, as are known in the art. Preferably, an interpolator 27 is used to up-sample the symbol stream, and a shaper (or shaping filter) 29 applies square root raised-cosine shaping to the filtered symbols, for the purpose of reducing inter-symbol interference. Further preferably, the shaper applies a power spectral density (PSD) mask filter to the symbols. (The shaping function can also be performed in part by Tx filter 26.) The shaped signals are passed to an up-converter 31, and from there to analog front end (AFE) circuitry 35.

The output symbols generated by transmitter 20 are conveyed as an electrical signal by channel 30, which typically comprises a twisted-pair connection, to receiver 40. The channel adds noise and distortion to the signal, as is known in the art. Signals received by receiver 40 are processed, digitized, down-converted and decimated by analog front end 35 and by a down-converter 37. Optionally, the digitized signals are filtered by a receive (Rx) digital filter 39. The signals are then passed as a sequence of digital samples to an equalization and decision block 45. This block typically includes a forward filter equalizer (FFE) 32 and a decision feedback equalizer (DFE) 36.

FFE 32 and DFE 36 preferably comprise multi-tap filters, having coefficients that are determined adaptively to compensate for the effects of channel 30, as is known in the art. To the extent that the precoding applied by precoder 25 compensates for the effects of digital filters 26, 29 and 39, however, there is almost no need for DFE 36 to compensate for distortion due to these filters. (The equalizers may still adaptively apply a small correction for the filter effects.) Consequently, DFE 36 in receiver 40 typically can have fewer taps and be of simpler design, with less concern for problems of error propagation, than in VDSL receivers that are known in the art. It is desirable, however, that FFE 32 include a sufficient number of taps so as to substantially reduce the energy level of precursors in the received signals. Generally, a FFE that is designed to deal adequately with the response of channel 30 alone (without the effect of Tx filter 26 and Rx filter 39) will be able to deal satisfactorily with the precursor level. As described hereinbelow, after DFE 36 has adapted to compensate for the channel effects, its coefficients are preferably transferred to precoder 25, and the DFE is then deactivated.

Samples output by FFE 32 and DFE 36 (when it is active) are summed by an adder 33 and are then processed by an extended slicer 34. The slicer takes real and imaginary parts of each sample and assigns the sample to a corresponding point in the expanded constellation, so as to recover the symbols that were output by transmitter 20. It is termed an "extended slicer" since it must deal with the expanded constellation, but otherwise it is substantially similar in design and function to slicers known in the art. A modulo reduction device 38, substantially similar to device 24, applies a modulo operation, as described in equation (2) above, to each of the recovered symbols, and thus generates a sequence of QAM symbols in the original input constellation. These symbols are processed by a decoder 42 to generate an output stream of digital data, reproducing the data that were input to transmitter 20.

Typically, a first stage of the transmitter, including precoder 25 and digital filter 26, operates at the transmitter symbol rate, while a second Stage, including shaper 29, for example, operates at twice the symbol rate. (Interpolator 27 performs the required up-sampling between the first and second stages.) The precoder preferably compensates for the first stage, i.e., for the filtering that is implemented at the symbol rate clock. The advantage of embodiments in which the precoder precodes only for Tx filter 26 is that in this case, the output of this stage, running at the symbol rate, into the second stage includes extended constellation data, as described below, which requires only a small number of bits to represent accurately. This quality allows efficient implementation of the second stage. Alternatively, the precoder may be used to compensate for the filters in both the first stage and the second stage, as well as for the effects of channel 30 and/or filtering in receiver 40.

Preferably, precoder 25 functions cooperatively with Tx filter 26 and/or Rx filter 39 to impose a notch filter on the transmitted signals. The notch filter is typically designed to attenuate the spectral power of the output of transmitter 20 in certain spectral bands, such as HF amateur radio bands, in which radio frequency (RF) emission from system 10 may cause interference. Alternatively or additionally, the notch filter is adapted to attenuate RF interference (RFI) reaching receiver 40 from ambient sources, such as radio transmissions, originating outside system 10. Filters 26 and 39 can also include a combination of filters of this type so as to create a wider notch or multiple notches at different frequencies. Further alternatively or additionally, the combination of the precoder and one or more of the filters may be adapted to perform other filtering and spectral shaping functions.

Based on digital filters 26 and/or 39, and optionally on shaper 29, a combined filter response is determined for application by precoder 25. This combined response may take into account the total effects of the filters or, alternatively, only a selected part of the effects. Typically, shaper 29 and Rx filter 39 operate at different clock frequencies from precoder 25 and Tx filter 26. Therefore, some mathematical manipulation is required in order to make the precoder compensate, in whole or in part, for the effects of the shaper and Rx filter, as will be apparent to those skilled in the art. Alternatively, this compensation may be achieved by allowing DFE 36 to converge, and then passing the DFE coefficients to the precoder, as described hereinbelow.

In the description that follows, the filter response that is compensated for by precoder 25 is referred to as a notch, filter response, given in the z-transform domain as NF(z). It will be understood, however, that the principles embodied in the description are equally applicable to filters of other types. In the most general terms, the notch response can be expressed as an IIR:

$$NF(z) = \frac{A(z)}{B(z)} \quad (3)$$

wherein A and B are arbitrary complex polynomials. The response of feedback filter 28 in precoder 25 that is needed to compensate for this notch filtering is NF(z)−1.

Figure 2A:
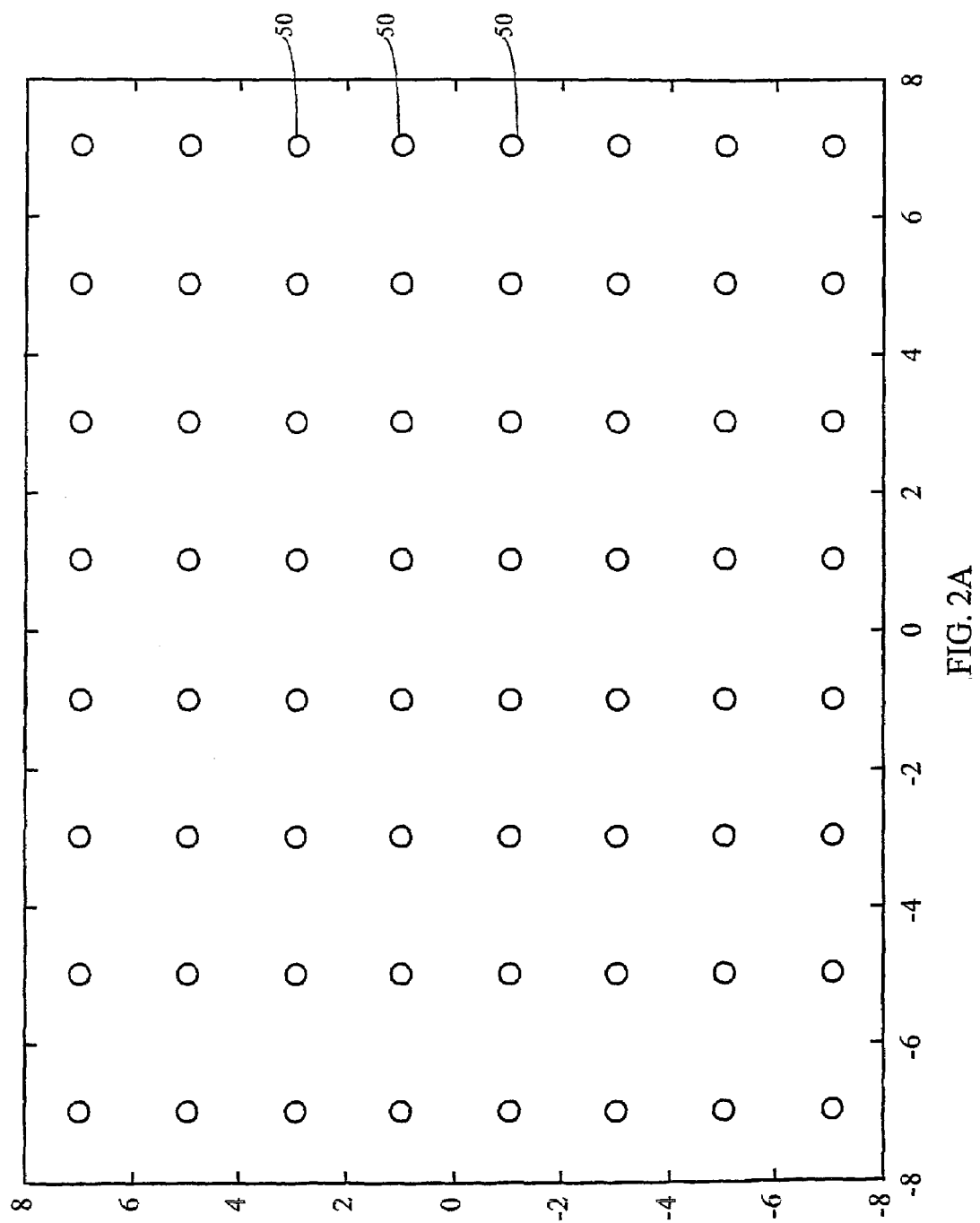
FIG. 2A is a plot that schematically illustrates an input constellation of symbols in the transmitter of FIG. 1, in accordance with a preferred embodiment of the present invention.
Figure 2B:
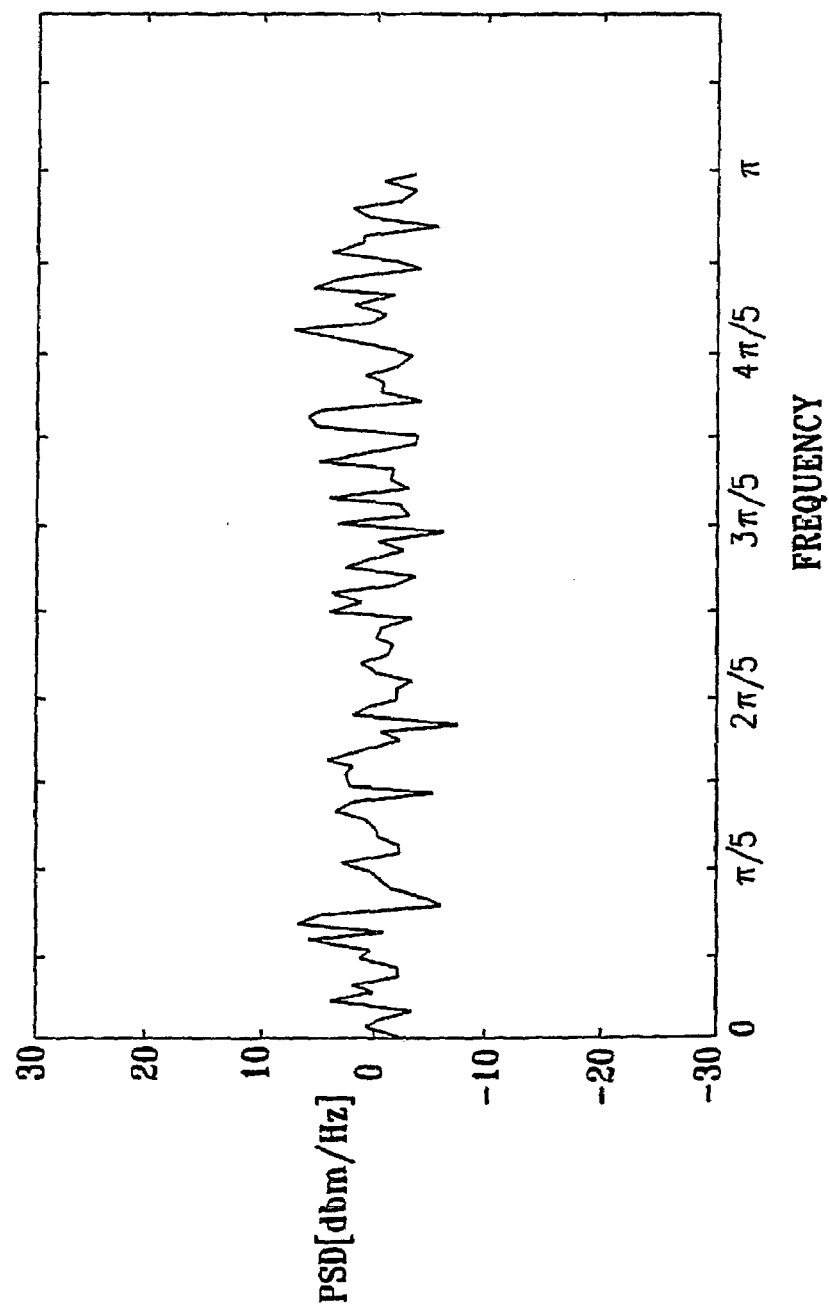
FIG. 2B is a plot that schematically illustrates a spectrum corresponding to the symbols of FIG. 2A.

FIGS. 2A and 2B are plots that schematically illustrate characteristics of input symbols generated by encoder 22 for input to precoder 25, in accordance with a preferred embodiment of the present invention. As shown in FIG. 2A, the symbols are distributed in an evenly-spaced, 8×8 constellation, as is known in the art, wherein each possible symbol is represented by a mark 50. FIG. 2B shows a simulated spectrum generated when these symbols are transmitted by transmitter 20 without precoding or filtering. FIG. 2B shows the spectrum at the input to shaper 29, which is identical in this case to the output of encoder 22. The frequency range of the plot is normalized by the sampling rate to be from 0 to 0.5, wherein 0.5 represents half of the sampling frequency. The spectrum is uniform over the frequency range.

Figure 3:
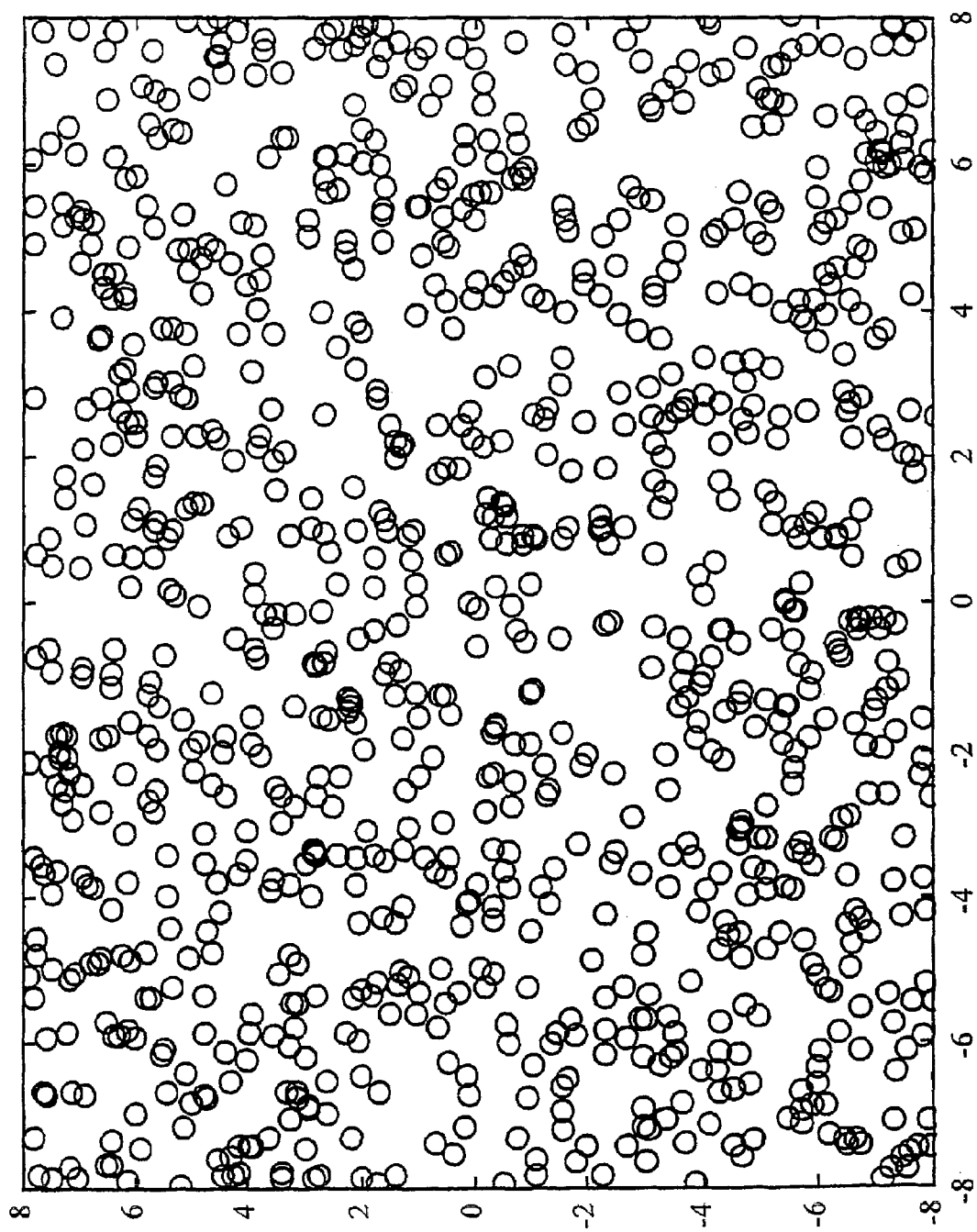
FIG. 3 is a plot that schematically illustrates a constellation of precoded symbols generated in the transmitter of FIG. 1, in accordance with a preferred embodiment of the present invention.

FIG. 3 is a plot that schematically illustrates interim, precoded symbols generated by precoder 25, operating on the input symbols of FIG. 2A, in accordance with a preferred embodiment of the present invention. The seemingly-random constellation of FIG. 3 shows the effect of feedback filter 28. The operation of modulo device 24, with M (in equation (2)) set to the value 8, generates precoded symbols whose real and imaginary parts are both within respective ranges from −8 to 8.

Figure 4A:
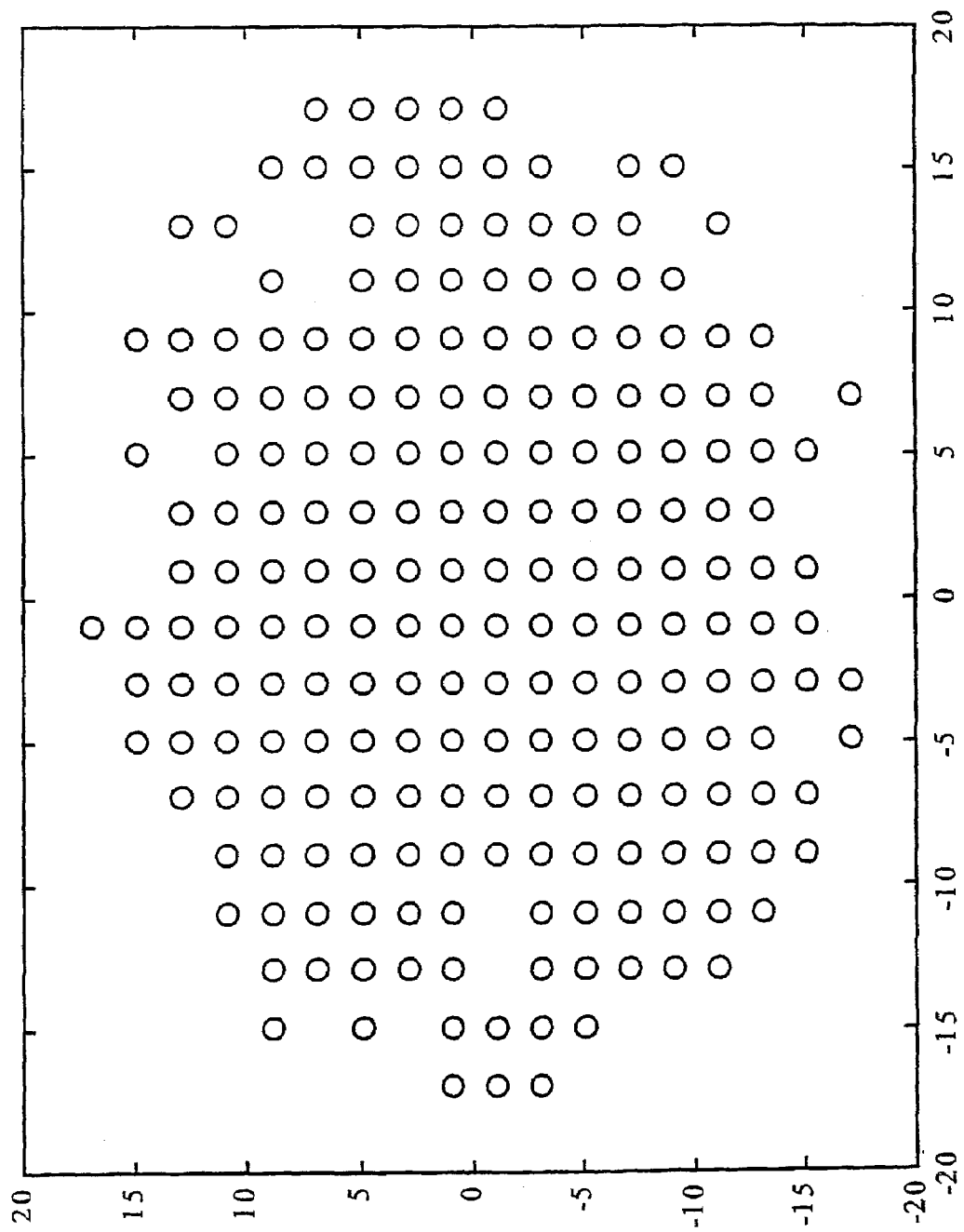
FIG. 4A is a plot that schematically illustrates a constellation of output symbols generated by the transmitter of FIG. 1, in accordance with a preferred embodiment of the present invention.
Figure 4B:
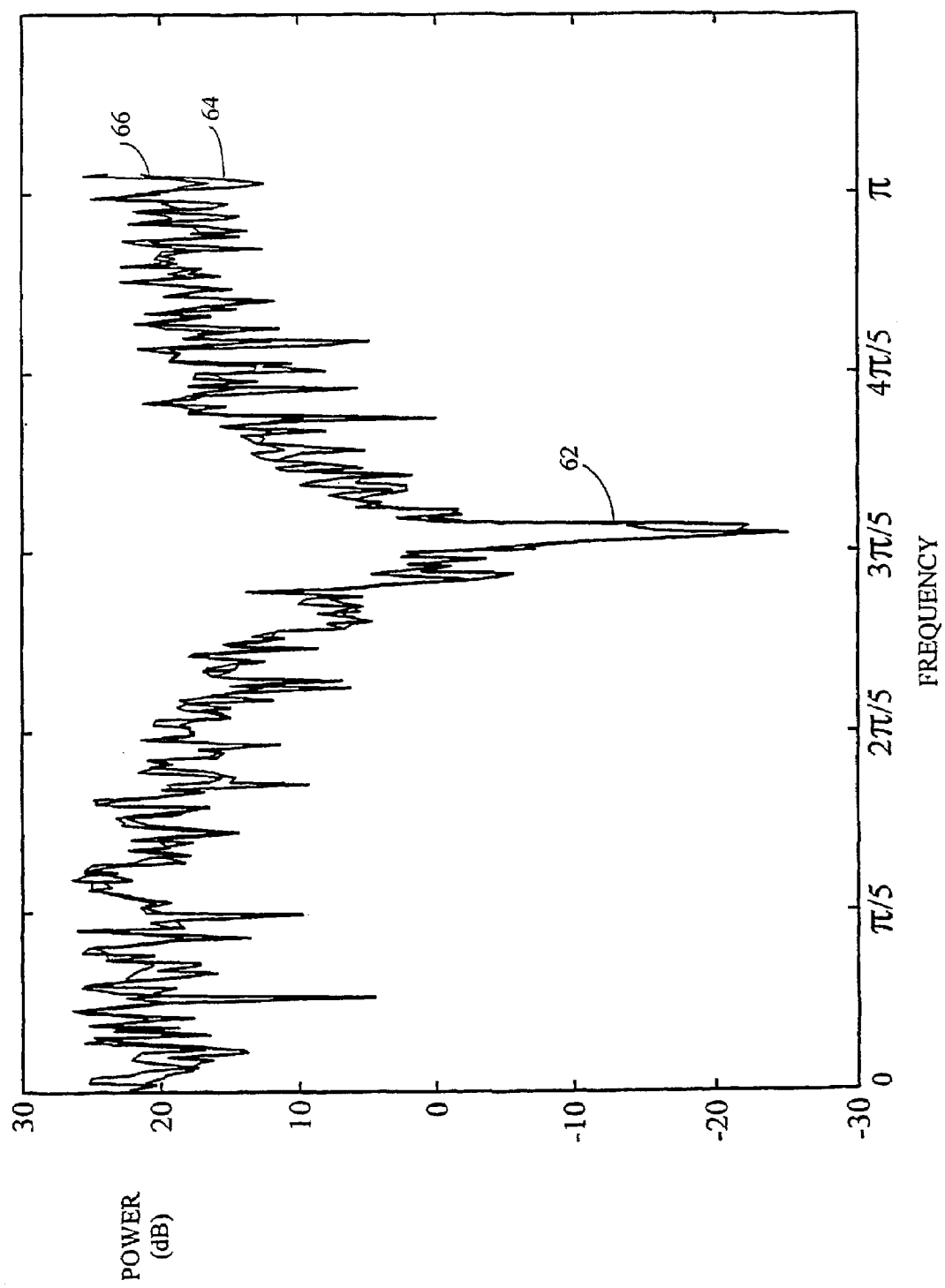
FIG. 4B is a plot that schematically illustrates a spectrum corresponding to the symbols of FIG. 4A.

FIGS. 4A and 4B are plots that schematically illustrate characteristics of the output symbols generated by filter 26, in accordance with a preferred embodiment of the present invention, in which precoder 25 precodes only for Tx filter 26, as described above. The constellation of the symbols, shown in FIG. 4A, is expanded due to the effect of the filter. Every one of the points in the expanded output constellation is represented by a mark 60. The complex value of each point in the output constellation is shifted by $(B_{real} + j*B_{imag}) \cdot 2M$ relative to the corresponding input constellation point, wherein $B_{real}$ and $B_{imag}$ are integers. In other words, by applying the modulo operation of equation (2) to the real and imaginary parts of each of the points in the expanded output constellation, the corresponding points in the input constellation of FIG. 2A are recovered. In this manner, the symbols output by transmitter 20 are related by modulo 2M to the input symbols generated by encoder 22.

FIG. 4B shows the spectrum of the output signals in the constellation of FIG. 4A. A notch 62 of greater than 20 dB is generated at a selected frequency, in this case at a normalized frequency of approximately 0.2.

Returning now to FIG. 1, we note that while precoder 25 is operative and precodes for the Tx and Rx filters, DFE 36 needs to compensate only for the effective response of channel 30, which includes the channel itself, together with FFE 32 and other parts of system 10, possibly including elements of the Tx and/or Rx filters, that are not handled by precoder 25. Assuming the causal part of the effective channel response to be H(z) when sampled at the symbol rate, the coefficients of DFE 36 will converge to a response DFEh given by:

$$DFEh(z) = (H(z)-1) \cdot z \quad (4)$$

Precoder 25 may also be used to compensate for the channel response H(z), in addition to the notch filter response NF(z). In this case, the response F(z) of feedback filter 28 is given by substitution from equations (3) and (4) as:

$$F(z) = H(z) \cdot NF(z) - 1 \quad (5)$$
$$= \frac{(1 + z^{-1} \cdot DFEh(z)) \cdot A(z) - B(z)}{B(z)}$$

A(z) and B(z) are known in advance, since they are determined by elements of the transmitter or communicated from the receiver to the transmitter upon initiation of communications. DFEh(z) is preferably determined simply by running system 10 using a training signal while filters 26, 29 and 39 are at least partially inoperative, typically with the notch response inactivated. Once DFE 36 has converged under these conditions, the coefficients representing DFEh can be transferred to feedback filter 28, and the DFE can subsequently be deactivated. Procedures for training the DFE and for transferring filter parameters between transmitter 20 and receiver 40 are described in detail hereinbelow with reference to FIGS. 9 and 10.

In an alternative embodiment, DFEh may be determined while precoder 25 is active together with filters 26, 29 and 39 (in whole or in part). The adaptation process of the DFE in this case operates on the expanded constellation generated by the precoding, rather than on the basic constellation generated by encoder 22. If a training sequence is not used, the convergence problem can be solved using blind equalization techniques known in the art, as described generally, for example, in the above book by Gitlin et at., pages 585–590. Conventional blind equalization, however, assumes that the symbols are uniformly distributed among the constellation points. When precoding is used, as in embodiments of the present invention, the statistical distribution of the expanded constellation points is no longer uniform. Therefore, the characteristics of the precoder feedback filter or of the Tx filter are used to determine the distribution of the expanded constellation, which is then used in the blind equalization procedure. DFEh will still converge under these conditions to substantially the same value as that derived above (to within a small difference corrected in final adaptation of the DFE).

Implementation of precoder 25 using equation (5) has the advantage of requiring much simpler hardware than precoders known in the art. The IIR scheme reflected by this equation typically calls for fewer mathematical operations than do FIR schemes. Furthermore, a FIR generally needs many more taps than an IIR in order to generate an equivalent impulse response, particularly a notch response.

Figure 5:
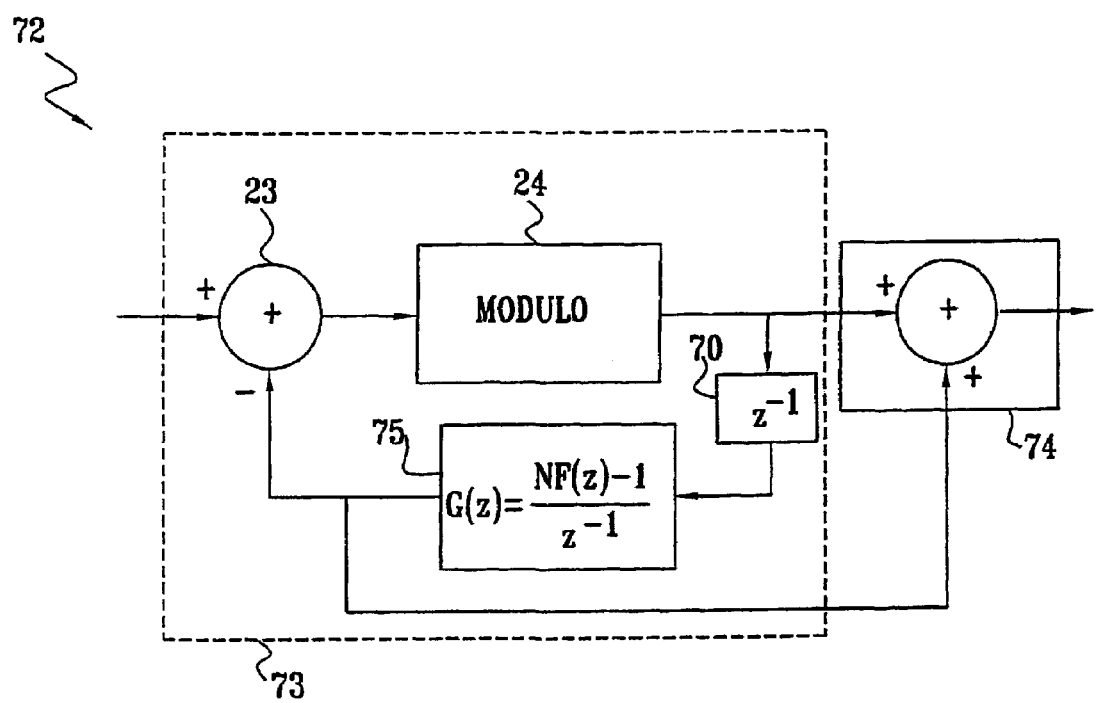
FIG. 5 is a block diagram that schematically illustrates a precoding and filtering section of a high-speed data transmitter, in accordance with a preferred embodiment of the present invention.

FIG. 5 is a block diagram that schematically illustrates a precoding and filtering section 72 of a digital data transmitter, in accordance with a preferred embodiment of the present invention. Section 72 comprises a precoder 73 and an adder 74, which can be used in place of precoder 25 and Tx filter 26 in transmitter 20 (shown in FIG. 1). Precoder 73 comprises a feedback loop that includes a delay unit 70, with response $z^{-1}$, and a filter 75, having response G(z) given by the following equation:

$$G(z)=[NF(z)-1]/z^{-1} \qquad (6)$$

Thus, the feedback loop has a total response equivalent to $NF(z)-1$, as required of a Tomlinson-Harashima precoder that is needed to precode for a notch filter response NF(z).

Solving equation (6) for the filter response NF(z) gives $NF(z)=z^{-1} \cdot G(z)+1$. Thus, the net effect of adder 74, applied to the precoded symbols output by modulo device 24, is simply NF(z). In other words, adder 74 takes the place of a multi-tap FIR or IIR filter, and only a single multi-tap filter is required in the transmitter. By contrast, transmitters known in the art, such as that described in the abovementioned PCT publication WO 98/48545, use two separate FIRs to accomplish the precoding and filtering functions. The novel configuration of precoding and filtering section 72 is not limited to the notch filter response NF(z), and may be used to implement and precode for substantially any fixed filter response (Tx_F(z)) used in the transmitter.

Figure 6:
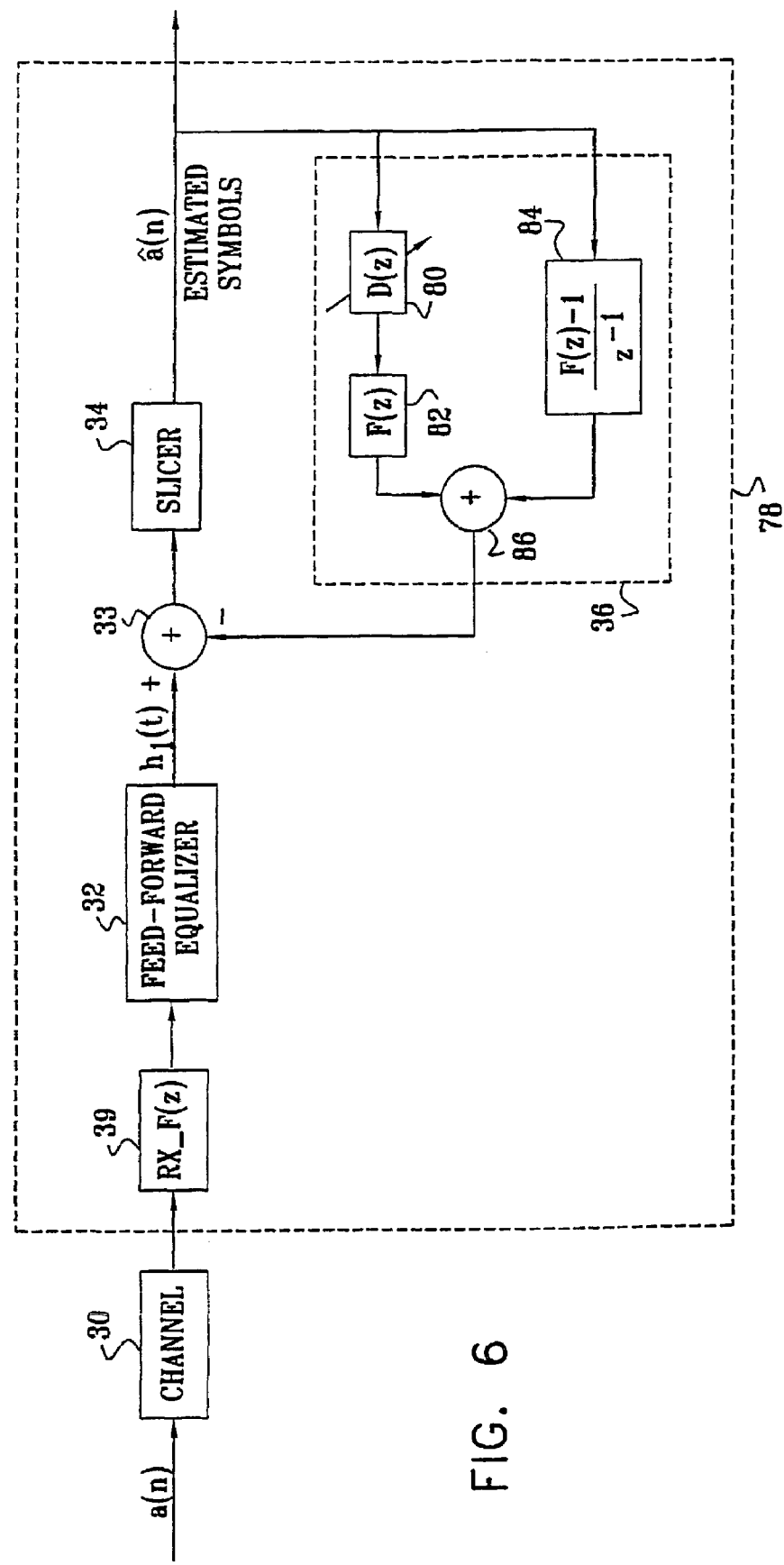
FIG. 6 is a block diagram that schematically illustrates a high-speed data receiver, showing particularly details of a decision feedback equalizer used in the receiver, in accordance with a preferred embodiment of the present invention.

FIG. 6 is a block diagram that schematically illustrates elements of a receiver 78, in accordance with a preferred embodiment of the present invention. The elements of receiver 78 that are shown in FIG. 6 may be used in place of the equivalent elements of receiver 40 (FIG. 1). As noted above, this receiver is typically used in conjunction with a transmitter, such as transmitter 20, within a modem. The rationale for receiver 78 and its use are described in detail in the above-mentioned U.S. patent application Ser. No. 09/521,495. Key points that are of relevance to the present invention are described hereinbelow.

Receiver 78 receives a signal comprising a stream of symbols a(n), transmitted over channel 30. Digital filter 39, having response Rx_F(z), is applied to the transmitted signal. Receiver 78 also comprises other input and output elements, such as those shown in FIG. 1, but these elements are not of particular relevance to the present embodiment and are omitted from FIG. 6 for the sake of clarity of illustration. Following equalization by FFE 32 and DFE 36, slicer 34 generates a stream of output symbols, representing an estimate of the input symbols a(n) sent by the transmitter.

To explain the structure of DFE 36, let h(t) be the impulse response of channel 30 together with FFE 32, and let $H^+(z)$ represent the frequency response of the causal part of h(t), i.e., the cursor and postcursors, at the output of FFE 32. The frequency transfer function of DFE 36, D(z), that is required to equalize $H^+(z)$ (ignoring for the moment the effect of filter 39) is given by:

$$D(z) = \frac{H^+(z)-1}{z^{-1}} \qquad (7)$$

(The terms D(z) here and DFEh(z) above are used interchangeably.) Thus, $H^+(z)=D(z) \cdot z^{-1}+1$.

When a filter with response F(z) is added to the channel, the combined impulse response $h_1(t)$ has a causal part whose frequency response $H_1^+(z)$ is given by $H_1^+(z)=H^+(z) \cdot F(z)$ (since any implementable digital filter has a causal response). Preferably, $F(z)=Tx\_F(z)*Rx\_F(z)$, combining the fixed responses of both the transmitter and the receiver. Alternatively, F(z) may reflect only Tx_F(z) or only Rx_F (z). In order to compensate for both the channel and filter responses, the DFE must now have a frequency transfer function given by:

$$\begin{aligned} D_1(z) &= \frac{H_1^+(z)-1}{z^{-1}} \qquad (8) \\ &= \frac{H^+(z) \cdot F(z)-1}{z^{-1}} \\ &= \frac{(D(z) \cdot z^{-1}+1) \cdot F(z)-1}{z^{-1}} \\ &= D(z) \cdot F(z) + \frac{F(z)-1}{z^{-1}} \end{aligned}$$

This convenient decomposition of the filter response is implemented in DFE 36, as shown in FIG. 6. The first term in $D_1(z)$, $D(z) \cdot F(z)$, is implemented by an adaptive block 80 with response D(z) and a fixed block 82 with response F(z), i.e., with a fixed response identical to that of the fixed Tx and/or Rx filter. The second term is implemented by a block 84 with fixed response $$\frac{F(z)-1}{z^{-1}}.$$

Thus, only block 80 should have adaptive filter coefficients. These adaptive coefficients correspond only to the response of channel 30, substantially irrespective of filter 39 (as long as FFE 32 has sufficient taps to compensate substantially totally for precursor interference). The outputs of blocks 82 and 84 are summed by an adder 86.

To start up operation of receiver 78, the coefficients for fixed filter response F(z) are input to DFE 36, including Rx_F(z) from filter 39 and Tx_F(z) from the transmitter, as appropriate. The transmitter then sends a training sequence of symbols to the receiver, and the coefficients of D(z) are allowed to adapt to the response of channel 30. Various methods for training equalizers are known in the art and can be applied here, as well. Typically, transmitting a known training sequence is the simplest and most robust method (particularly when the precoder is not activated during equalizer training). Alternatively or additionally, the training may start with only a FIR filter operating in the DFE. After some initial convergence, the FIR characteristics are translated to the required IIR structure based on the known filter components and their corresponding poles. Preferably, a least-mean-square (LMS) adaptation algorithm is used to adaptively determine the DFE filter coefficients, as described in the above-mentioned U.S. patent application Ser. No. 09/521,495.

Once the coefficients of D(z) have converged, they are preferably conveyed to the feedback filter of a suitable precoder in the transmitter, and block 80 may then be turned off. Alternatively, only a portion of the coefficients, typically the largest coefficients, are conveyed to the precoder. Still further alternatively or additionally, the fixed coefficients of F(z), or at least of a part of F(z), are conveyed to the precoder. It may thus be possible to turn off the entire DFE after the start-up procedure is completed, and to transfer its entire function to the precoder. Start-up procedures for this purpose are further described hereinbelow with reference to FIGS. 9 and 10.

Figure 7:
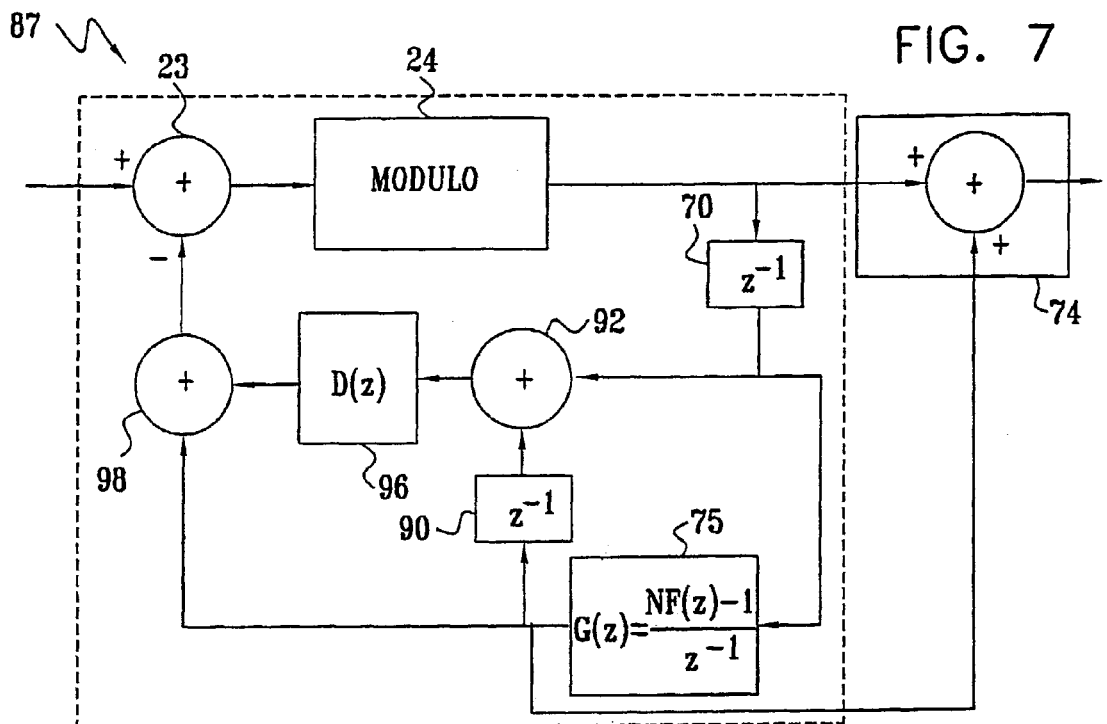
FIG. 7 is a block diagram that schematically illustrates a precoding and filtering section of a high-speed data transmitter, in accordance with another preferred embodiment of the present invention.

FIG. 7 is a block diagram that schematically illustrates a precoding and filtering section 87 of a digital data transmitter, in accordance with another preferred embodiment of the present invention. In this embodiment, a precoder 89 includes both fixed filter 75, with fixed response G(z), and a variable filter 96, with response D(z) (i.e., DFEh(z)). G(z) is given by equation (6), as explained above with reference to FIG. 5. D(z) compensates for the variable response of channel 30 and is generally equivalent to the response D(z) of block 80, shown in FIG. 6. Preferably, the coefficients for use in filter 96 are conveyed to the transmitter after they have converged at the receiver in a suitable start-up procedure. Section 87 may be used, like section 72 (FIG. 5), in place of precoder 25 and filter 26 in transmitter 20 (FIG. 1), with concomitant savings in filter hardware.

Precoder 25 comprises an additional delay unit 90 and adders 92 and 98, so as to build up an equivalent feedback filter response Pre(z) given by:

$$Pre(z) = G(z) + D(z) \cdot [z^{-1} \cdot G(z) + 1] \quad (9)$$
$$= G(z) + D(z) \cdot NF(z)$$

Equation (9) defines the precoder that corresponds to the DFE defined by equation (8). The first term in equation (9), G(z), precodes for the fixed filter components in the transmitter, in equivalent fashion to filter 75 in FIG. 5. The second term in the equation precodes for the variable channel response, in equivalent fashion to blocks 80 and 82 in FIG. 6. The output of filter 75 in precoder 89 is used, together with adder 74, to construct the filter response NF(z) in the Tx path, equivalent to filter 26 in FIG. 1.

Figure 8:
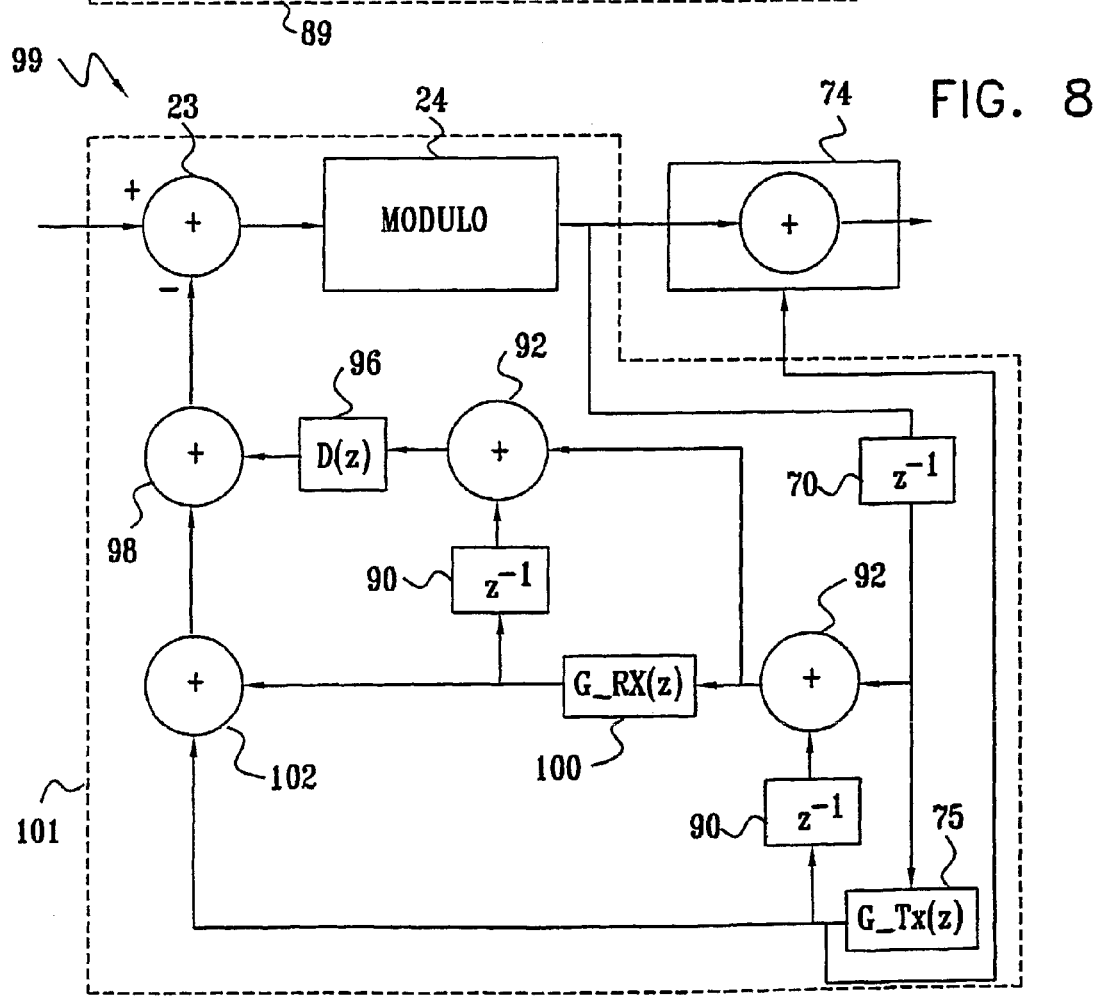
FIG. 8 is a block diagram that schematically illustrates a precoding and filtering section of a high-speed data transmitter, in accordance with still another preferred embodiment of the present invention.

FIG. 8 is a block diagram that schematically illustrates a precoding and filtering section 99 of a digital data transmitter, in accordance with yet another preferred embodiment of the present invention. In this embodiment, a precoder 101 includes fixed filter 75, with response G_Tx(z), and variable filter 96, with response D(z), as in the precoding embodiment, as well as an additional fixed filter 100, with response G_Rx(z). Here G_Tx and G_Rx are equivalent to the response G(z) described above, with respect to the fixed transmitter filter Tx_F(z) and the fixed receiver filter Rx_F(z) (not shown in this figure). Delay units 92 and adders 92, 98 and 102 are used to generate a total equivalent feedback filter response Pre(z), given in this case by:

$$Pre(z) = G\_Tx(z) + G\_Rx(z) \cdot [z^{-1} \cdot G\_Tx(z) + 1] + \quad (10)$$
$$D(z) \cdot [z^{-1} \cdot G\_Rx(z) + 1] \cdot [z^{-1} \cdot G\_Tx(z) + 1]$$
$$= [Tx\_F(z) \cdot Rx\_F(z) - 1]/z^{-1} +$$
$$D(z) \cdot Tx\_F(z) \cdot Rx\_F(z)$$
$$= [Fixed\_component(z) - 1]/z^{-1} +$$
$$D(z) \cdot Fixed\_component(z)$$

The derivation of equation (10) makes use of the relations: $G\_Tx(z)=[Tx\_F(z)-1]/z^{-1}$ and $G\_Rx(z)=[Rx\_F(z)-1]/z^{-1}$. Precoder 101 is thus able to compensate for the combined effects of the notch filters, or other fixed filters, in both the transmitter and the receiver and for the variable channel response. It obviates the need for the DFE in the receiver.

Figure 9:
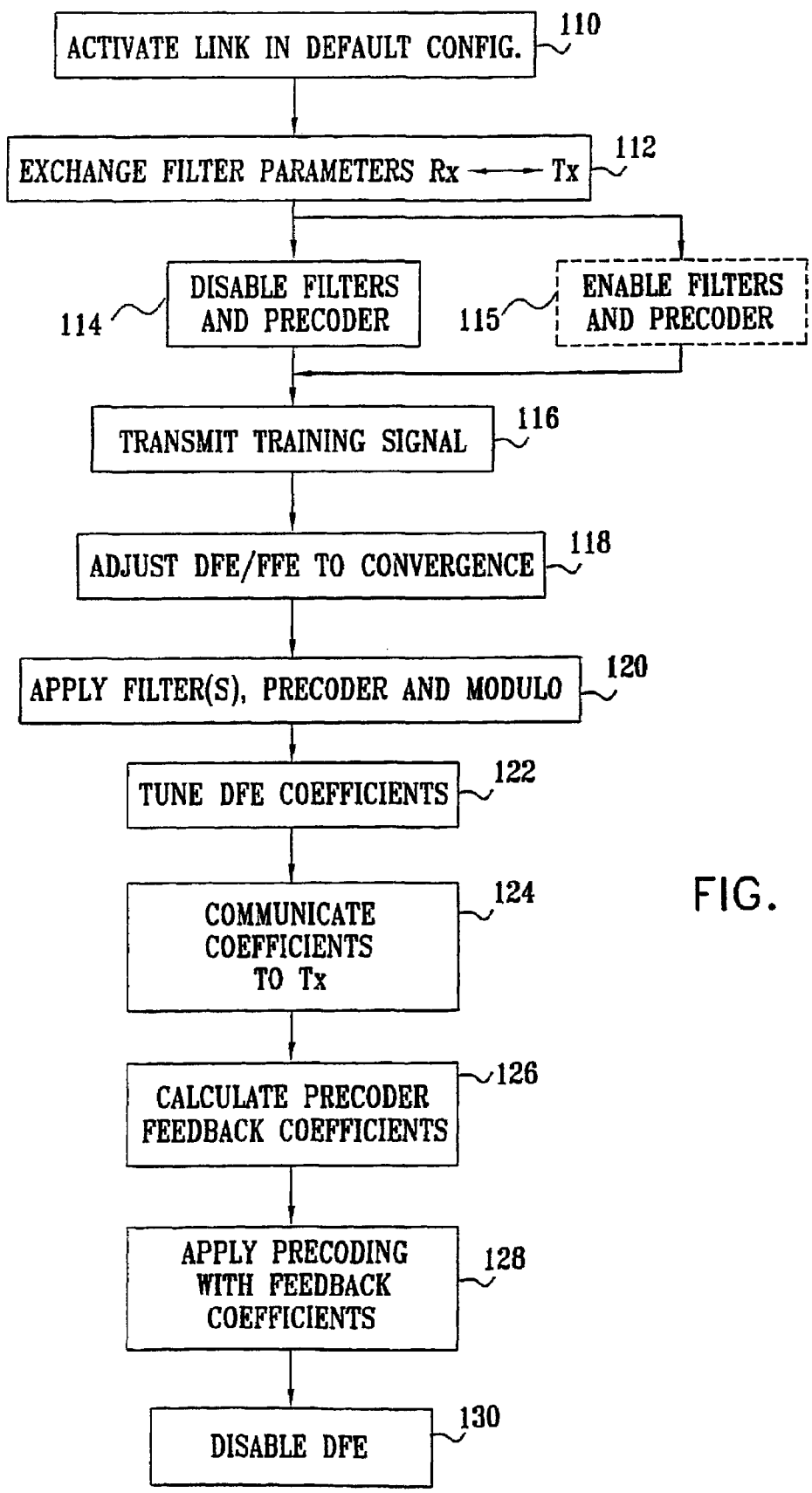
FIG. 9 is a flow chart that schematically illustrates a method for initializing a precoder in a high-speed data transmitter, in accordance with a preferred embodiment of the present invention.
Figure 10:
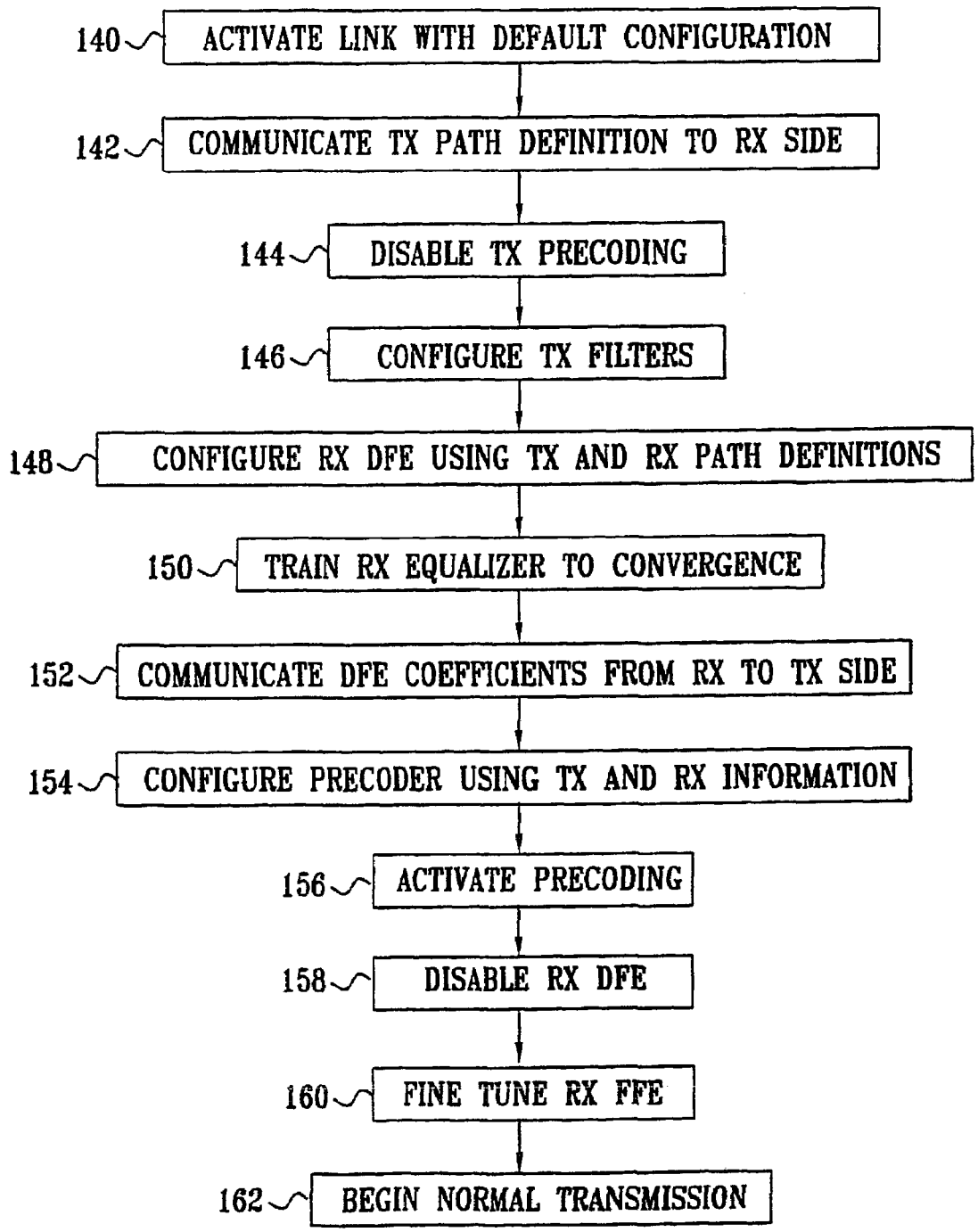
FIG. 10 is a flow chart that schematically illustrates a method for initializing a precoder in a high-speed data transmitter, in accordance with another preferred embodiment of the present invention.

Reference is now made to FIGS. 9 and 10, which are flow charts that schematically illustrate methods for adaptively setting the coefficients of feedback filter 28 in transmitter 20 (FIG. 1), in accordance with preferred embodiments of the present invention. They are similarly applicable to the alternative feedback filters shown in FIGS. 7 and 8. The specific methods depicted in FIGS. 9 and 10 are meant to illustrate a number of possible approaches for startup sequences, including:

Case 1 (exemplified by FIG. 9), in which the precoder is active during equalizer training. In this case, training is done with an expanded constellation, so that an extended slicer is needed in the receiver.

Case 2 (exemplified by FIG. 9), in which training starts with the precoder inactive. The notch filters are preferably also inactive, but may be active in part. Subsequently, the notches (Rx and/or Tx) are activated together with their appropriate DFE correction (illustrated in FIG. 6) and/or precoding (illustrated in FIGS. 7 and 8).

Case 3 (exemplified by FIG. 10), in which the precoder is not active during equalizer training. In this case, the DFE is trained using a simple (not expanded) constellation.

In all cases, the DFE may use the scheme shown in FIG. 6, in which the DFE includes correction for a known filter component. It should be understood that these three approaches are not mutually exclusive, and elements of the different approaches may be combined in various ways, based on different combinations of steps from the methods of FIGS. 9 and 10.

As noted above, the method of FIG. 9 is typically used for adaptively setting the coefficients of feedback filter 28 in transmitter 20 (FIG. 1). This procedure may also be used mutatis mutandis, to set the coefficients used in filter 96 in precoder 89 (FIG. 7) or in precoder 101 (FIG. 8). To begin the procedure, the link between transmitter 20 and receiver 40 via channel 30 is activated in a default mode, at an activation step 110. The default mode preferably uses a low data rate (possibly using a different coding scheme from that used in later communications), with filters 26 and 39 inactive and/or with the transmitter and receiver set so that the transmitted signals do not substantially overlap any designated notches. It enables robust, low-rate communications between the transmitter and the receiver.

Communications between transmitter 20 and receiver 40 in the default mode begin with an exchange of parameters of filters 26, 29 and 39 between the receiver and transmitter, at a parameter exchange step 112. The receiver parameters are used by the transmitter in setting the coefficients of feedback filter 28. The transmitter parameters can also be used by the receiver, to facilitate adaptation of the elements of equalization and decision block 45, as described, for example, in the above-mentioned U.S. patent application Ser. No. 09/521,495. Preferably, the parameters of filters 29 and 39, which typically operate at a clock rate higher than the transmitted symbol rate, as mentioned above, are converted to their symbol rate equivalents before they are exchanged.

An adaptation procedure follows the parameter exchange. The Rx and Tx paths may be configured in two alternative ways before adaptation starts, shown in a filter disabling step 114 and a filter enabling step 115. In step 114, the notch elements of digital filters 26, 29 and/or 39 are preferably disabled. Precoder 25 is preferably also inoperative at this stage, or at least, filter 28 is disabled. Alternatively, in step 115, the Tx and Rx notch filters are enabled (entirely or in part), and the precoder is enabled, as well. The precoder in this case precodes for all or part of the active Rx and Tx notches (filters 26, 29 and 39). The DFE adaptation is carried out in this case with an expanded constellation at the output of slicer 34. In either case, the DFE is preferably configured as a DFE with a fixed component correction, as described above, and most preferably with a fixed IIR filter portion. The correction filter in the DFE preferably compensates for any part of the Tx and/or Rx filters that is not precoded for by the precoder.

In any case, at a training step 116, transmitter 20 transmits a training signal over channel 30 to receiver 40. The coefficients of FFE 32 and DFE 36 are adjusted adaptively, as is known in the art, while the receiver is receiving the training signal. The adjustment continues until the coefficients have converged, at a convergence step 118.

If the notch elements of filters 26, 28, 29 and 39 were disabled at step 114, in whole or in part, they are turned on, at a filter application step 120, along with precoder 25, which is configured to precode for these elements along with any other filter elements that were initially activated. Alternatively or additionally, the insertion of filters together with appropriate precoding may also be done during normal operation if required for some external reason. At this point, feedback filter 28 is set only to compensate for the predetermined, known response of filters 26, 29 and 39, as given by equation (3). Preferably, the coefficients of DFE 36 are adaptively readjusted, at an additional tuning step 122. The readjustment compensates for any residual distortion that is induced by filters 26 and 39 and is not cancelled by precoder 25. This residual distortion is generally small.

The values of the readjusted coefficients of DFE 36 are preferably sent back from receiver 40 to transmitter 20, at a coefficient communication step 124. These values are used in calculating final coefficients for feedback filter 28, based on equations (5), (9) or (10), at a precoder calculation step 126. Precoder 25 begins to operate using the final coefficients, at a precoding step 128. DFE 36 can now be disabled, at a DFE disablement step 130. Alternatively, only some of the DFE coefficients, preferably the largest of the coefficients, are passed from receiver 40 to feedback filter 28 at step 124. For this purpose, the total DFE response is preferably split into to two sequences—one that stays as part of the DFE and one that is moved to the precoder. In this case, DFE 36 is not disabled, and remains active, with coefficients that are modified so that the overall equalization of the received signal is substantially the same as it was before the coefficients were passed to the feedback filter. In either case, the startup procedure between the transmitter and receiver is thus completed, and normal data communications can go on.

The alternative start-up procedure of FIG. 10 is preferably used in conjunction with a transmitter having a precoder of the type shown in FIG. 7 or 8. (It should be noted that the embodiment of FIG. 7 can be regarded as a special case of the embodiment of FIG. 8). As in the method of FIG. 9, the procedure begins with an activation step 140, establishing a default communication mode between the transmitter and the receiver. Under these conditions, all or part of the fixed filter definitions of the transmitter are passed to the receiver, at a Tx path definition step 142. Optionally, for convenience, the transmitter may simply convey the poles and zeroes of its notch filter to the receiver. Alternatively, the filter coefficients are conveyed. The transmitter is then temporarily configured so that its precoder 25 is disabled, at a disablement step 144. The transmit filters are activated with their appropriate, final settings, including notch filters, at a transmitter configuration step 146.

Preferably, DFE 36 in the receiver has the efficient form shown in FIG. 6, which enables the DFE to be set so as to equalize for both the fixed Tx and Rx filters (expressed as $F(z)=Tx\_F(z)*Rx\_F(z)$) and for the variable channel response $D(z)$. The DFE is configured to compensate for the fixed filters' responses, at a DFE configuration step 148, using the information conveyed from the transmitter at step 142. The transmitter then sends a training sequence to the receiver, at a training step 150, enabling the receiver to adaptively adjust the variable part $D(z)$ of the DFE. Preferably, to enhance convergence of the coefficients of $D(z)$, the training sequence uses a constellation of reduced size, such as a 4QAM constellation. Additionally or alternatively, some of the fixed filter elements in the transmitter and/or receiver may be temporarily switched off to facilitate convergence of $D(z)$. These elements are then switched on in sequence, and $D(z)$ is tuned for each one in turn.

After training step 150 is completed, the receiver communicates equalization information to the transmitter, at a communication step 152. The information preferably includes both the fixed Rx and Tx filter definitions that were used by the receiver in adjusting the DFE, and the definition of the DFE scheme used during initialization, i.e., the definitions of both the fixed (IIR) coefficients and the variable coefficients of $D(z)$ that were determined in the training procedure. In addition, this communication may include a definition of additional Rx filters that were not active during training and will be activated later on. The precoder in the transmitter is configured with the filter and DFE parameters conveyed from the receiver, at a precoder configuration step 154. In addition, the precoder may be configured to precode the additional Rx and Tx filter components that were not active during training and will be activated later on.

As an alternative to conveying the IIR definition of the DFE from the Rx to the Tx side, the receiver may convey to the transmitter a FIR equivalent definition of the combination of the fixed IIR filters and the variable DFE. In this case, the transmitter will have to calculate the factorization of this response into FIR and IIR filters, as shown in FIGS. 7 and 8. This factorization preferably uses the knowledge of the fixed components in the Rx and Tx path. Such calculated factorization may cause performance degradation due to its potential inaccuracy, however.

In the embodiment of FIG. 8, for example, the communicated or calculated DFE coefficients are used to set the coefficients of filters 72, 96 and 100 in precoder 101. The precoder is activated, at a precoding step 156, and the DFE in the receiver is deactivated, at a DFE disablement step 158. Under these conditions, the transmitter sends another training sequence, preferably also 4QAM, to the receiver, enabling the receiver to fine-tune the adaptable coefficients of FFE 32, at a fine tuning step 160. At this point, the training procedure is completed, and the transmitter can begin normal transmission, at a completion step 162, with a constellation increased to its normal size.

Alternatively, the DFE may remain active together with the precoder. In this case the DFE block in FIG. 6 is preferably split into two parts: One part is conveyed to the transmitter and is be replaced by the precoder. The other part remains active while the precoder is operating. The DFE will have to cope in this case with expanded constellations received at the slicer.

Although the methods of FIGS. 9 and 10 are described with particular reference to the transmitters and receivers shown in FIGS. 1 and 5–8, it will be appreciated that these methods are not limited to these particular hardware configurations. Rather, the start-up methods described hereinabove may be applied to a wide range of different equalization and precoding schemes, such as those described in the above-mentioned PCT publication WO 98/48545.

Furthermore, while preferred embodiments are described hereinabove mainly with reference to notch filtering, digital filters 26, 29, 39 and 28 may be used to implement a wide range of other digital filter types. These filters may include both infinite impulse response (IIR) and finite impulse response (FIR) types, as noted above. In one alternative embodiment, for example, filters 26 and 28 also comprise adjustable digital filters, which are adjusted for the purpose of "water filling," i.e., to shape the output power spectral density of transmitter 20 to optimally match the spectral characteristics of channel 30. Other shaping functions may similarly be implemented, either with or without the additional notch filtering function described herein.

Although preferred embodiments are described herein with particular reference to next-generation, ultra-high speed transmission systems, such as VDSL and HPNA, other applications of the principles of the present invention will be apparent to those skilled in the art. These principles may be adapted for use in substantially any transmitter/receiver pair that communicates by single-carrier modulation. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for conveying digital data from a transmitter to a receiver, comprising:
    specifying an infinite impulse response (IIR) spectral filtering profile to be applied in conveying the data;
    generating a sequence of input symbols at the transmitter corresponding to the data to be conveyed;
    precoding the input symbols at the transmitter using Tomlinson-Harashima precoding responsive to the specified profile, so as to generate a corresponding sequence of precoded symbols;
    filtering the precoded symbols in accordance with the specified profile;
    transmitting the filtered symbols to the receiver; and
    decoding the filtered symbols at the receiver so as to recover the data therefrom.

2. A method according to claim 1, wherein specifying the spectral filtering profile comprises specifying a notch filter to be applied to the precoded symbols.

3. A method according to claim 2, wherein filtering the precoded symbols comprises attenuating radio-frequency signals transmitted by the transmitter in a predetermined frequency band, so as to avoid generating radio frequency interference in that band.

4. A method according to claim 2, wherein filtering the precoded symbols comprises attenuating radio-frequency signals received by the receiver in a predetermined frequency band, so as to reject radio frequency interference received in that band.

5. A method according to claim 1, wherein filtering the precoded symbols comprises filtering the symbols at the transmitter.

6. A method according to claim 5, wherein filtering the symbols comprises filtering the symbols based on predetermined filtering parameters, and comprising communicating the parameters from the transmitter to the receiver for use in processing the symbols at the receiver.

7. A method according to claim 1, wherein filtering the precoded symbols comprises filtering the symbols at the receiver.

8. A method according to claim 7, wherein filtering the symbols comprises filtering the symbols based on predetermined filtering parameters, and comprising communicating the parameters from the receiver to the transmitter for use in precoding the input symbols.

9. A method according to claim 1, wherein generating the sequence of input signals comprises generating the sequence with a given input constellation, and wherein filtering the precoded symbols comprises generating output symbols having an output constellation that is expanded relative to the input constellation.

10. A method according to claim 9, wherein precoding the input symbols comprises applying the Tomlinson-Harashima precoding such that each of the input symbols can be recovered by taking a modulo of a corresponding one of the output symbols.

11. A method according to claim 10, wherein generating the sequence of input symbols comprises generating symbols having real and imaginary parts, and wherein precoding the input symbols comprises precoding both the real and imaginary parts of the input symbols such that both the real and imaginary parts can be recovered by taking a two-dimensional modulo of the real and imaginary parts of the corresponding output symbols.

12. A method according to claim 11, wherein generating the sequence of input symbols comprises generating Quadrature Amplitude Modulation (QAM) symbols.

13. A method according to claim 1, wherein the precoded symbols are conveyed from the transmitter to the receiver over a channel having a channel response, and wherein specifying the spectral profile comprises specifying at least a portion of the profile substantially independently of the channel response.

14. A method according to claim 13, wherein filtering the precoded symbols further comprises optimizing a power spectral density of the conveyed precoded symbols responsive to the channel response.

15. A method according to claim 13, and comprising determining the channel response, wherein precoding the input symbols comprises using the Tomlinson-Harashima precoding responsive to the channel response, as well as to the specified profile.

16. A method according to claim 1, wherein precoding the input symbols comprises:

filtering the sequence of precoded symbols by applying a feedback filter response thereto, so as to generate a corresponding sequence of feedback symbols, wherein the feedback filter response is substantially equal to the filtering profile less a zero-order time-domain component of the profile;

subtracting the feedback symbols from the corresponding input symbols, so as to generate a corresponding sequence of subtracted symbols; and mapping the subtracted symbols to the corresponding precoded symbols, such that each of the subtracted symbols in the sequence can be recovered by taking a modulo of the corresponding precoded symbol.

17. A method according to claim 16, wherein generating the sequence of input symbols comprises generating Quadrature Amplitude Modulation (QAM) symbols, having respective real and imaginary parts, and wherein mapping the subtracted symbols comprises mapping both real and imaginary parts of the subtracted symbols.

18. A method according to claim 16, wherein specifying the IIR spectral filtering profile comprises conveying to the transmitter a definition of a known filter component used in at least one of the transmitter and the receiver, the filter component having poles, and wherein applying the feedback filter response comprises applying the feedback filter response based on the poles of the known filter component.

19. A method according to claim 16, wherein specifying the spectral filtering profile comprises specifying a filter response given in the z-domain by $A(z)/B(z)$, A and B complex polynomials, and wherein the precoded symbols are conveyed from the transmitter to the receiver over a channel having a channel response $H(z)$, and wherein applying the feedback filter comprises applying a filter with a response $F(z)$ given substantially by $F(z) = \lfloor (1+z^{-1} \cdot DFEh(z)) \cdot A(z) - B(z) \rfloor / B(z)$, wherein $DFLh(z)$ is an equalizer response of a decision feedback equalizer that is suitable to compensate for the channel response at the receiver.

20. A method according to claim 19, wherein decoding the symbols comprises adaptively determining the response $DFEh(z)$ at the receiver, and wherein applying the filter with the response $F(z)$ comprises conveying an indication of the determined response $DFEh(z)$ to the transmitter for application by the feedback filter.

21. A method according to claim 16, wherein specifying the IIR spectral filtering profile comprises specifying a transmit filtering profile to be applied by the transmitter, and wherein applying the feedback filter response comprises generating interim transmit symbols by applying to the precoded symbols at least a portion of the feedback filter response corresponding to the transmit filtering profile, and wherein filtering the precoded symbols in accordance with the specified profile comprises adding the interim transmit symbols to the precoded symbols.

22. A method according to claim 1, wherein the transmitter transmits Very High Rate Digital Subscriber Line (VDSL) signals to the receiver based on the sequence of precoded symbols.

23. A method according to claim 1, wherein decoding the symbols at the receiver comprises taking a modulo of each of the symbols so as to recover the corresponding input symbol.

24. A method for conveying digital data from a transmitter to a receiver, comprising:

specifying a spectral filtering profile to be applied in conveying the data, including a transmit filtering profile to be applied by the transmitter;

generating a sequence of input symbols at the transmitter corresponding to the data to be conveyed;

precoding the input symbols responsive to the specified profile so as to generate a corresponding sequence of precoded symbols, wherein precoding the input symbols comprises:

applying a feedback filter response to the precoded symbols so as to generate a corresponding sequence of feedback symbols, at least a portion of the feedback filter response comprising a transmit feedback filter response corresponding to the transmit filtering profile, such that interim transmit symbols are generated due to applying the transmit feedback filter response to the precoded symbols;

subtracting the feedback symbols from the corresponding input symbols, so as to generate a corresponding sequence of subtracted symbols; and mapping the subtracted symbols to the corresponding precoded symbols, such that each of the subtracted symbols in the sequence can be recovered by taking a modulo of the corresponding precoded symbol;

generate output symbols that are filtered in accordance with the transmit filtering profile;

transmitting the output symbols to the receiver; and decoding the output symbols at the receiver so as to recover the data therefrom.

25. A method according to claim 24, wherein specifying the spectral filtering profile comprises specifying a notch filter to be applied to the precoded symbols.

26. A method according to claim 25, wherein applying the feedback filter response comprises attenuating radio-frequency signals transmitted by the transmitter in a predetermined frequency band, so as to avoid generating radio frequency interference in that band.

27. A method according to claim 25, wherein applying the feedback filter response comprises attenuating radio-frequency signals received by the receiver in a predetermined frequency band, so as to reject radio frequency interference received in that band.

28. A method according to claim 24, wherein the spectral filtering profile is substantially identical to the transmit filtering profile, such that the interim transmit symbols are the feedback symbols.

29. A method according to claim 24, wherein applying the feedback filter response comprises filtering the symbols at the transmitter based on predetermined filtering parameters, and comprising communicating the parameters from the transmitter to the receiver for use in processing the symbols at the receiver.

30. A method according to claim 24, wherein specifying the spectral filter response comprises specifying a receive filtering profile to be applied by the receiver, and wherein applying the feedback filter response comprises filtering the symbols responsive to the receive filtering profile.

31. A method according to claim 30, wherein filtering the symbols comprises filtering the symbols based on predetermined filtering parameters, and comprising communicating the parameters from the receiver to the transmitter for use in precoding the input symbols.

32. A method according to claim 24, wherein generating the sequence of input signals comprises generating the sequence with a given input constellation, and wherein filtering the precoded symbols comprises generating output symbols having an output constellation that is expanded relative to the input constellation.

33. A method according to claim 32, wherein precoding the input symbols comprises applying Tomlinson-Harashima precoding such that each of the input symbols can be recovered by taking a modulo of a corresponding one of the output symbols.

34. A method according to claim 33, wherein generating the sequence of input symbols comprises generating symbols having real and imaginary parts, and wherein precoding the input symbols comprises precoding both the real and imaginary parts of the input symbols such that both the real and imaginary parts can be recovered by taking a two-dimensional modulo of the real and imaginary parts of the corresponding output symbols.

35. A method according to claim 34, wherein generating the sequence of input symbols comprises generating Quadrature Amplitude Modulation (QAM) symbols.

36. A method according to claim 24, wherein the output symbols are conveyed from the transmitter to the receiver over a channel having a channel response, and wherein specifying the spectral profile comprises specifying at least a portion of the profile substantially independently of the channel response.

37. A method according to claim 36, wherein applying the feedback filter further comprises optimizing a power spectral density of the conveyed precoded symbols responsive to the channel response.

38. A method according to claim 37, and comprising determining the channel response, wherein precoding the input symbols comprises using the precoding responsive to the channel response, as well as to the specified profile.

39. A method according to claim 24, wherein generating the sequence of input symbols comprises generating Quadrature Amplitude Modulation (QAM) symbols, having respective real and imaginary parts, and wherein mapping the subtracted symbols comprises mapping both real and imaginary parts of the subtracted symbols.

40. A method according to claim 24, wherein specifying the spectral filtering profile comprises conveying to the transmitter a definition of a known filter component used in at least one of the transmitter and the receiver, the filter component having poles, and wherein applying the feedback filter response comprises applying the feedback filter response based on the poles of the known filter component.

41. A method according to claim 24, wherein specifying the spectral filtering profile comprises specifying a filter response given in the z-domain by $A(z)/B(z)$, A and B complex polynomials, and
wherein the precoded symbols are conveyed from the transmitter to the receiver over a channel having a channel response $H(z)$, and
wherein applying the feedback filter comprises applying a filter with a response $F(z)$ given substantially by $F(z) = \lfloor (1+z^{-1} \cdot DFEh(z)) \cdot A(z) - B(z) \rfloor / B(z)$,
wherein $DFEh(z)$ is an equalizer response of a decision feedback equalizer that is suitable to compensate for the channel response at the receiver.

42. A method according to claim 41, wherein decoding the symbols comprises adaptively determining the response $DFEh(z)$ at the receiver, and wherein applying the filter with the response $F(z)$ comprises conveying an indication of the determined response $DFEh(z)$ to the transmitter for application by the feedback filter.

43. A method according to claim 24, wherein the transmitter transmits Very High Rate Digital Subscriber Line (VDSL) signals to the receiver based on the sequence of precoded symbols.

44. A method according to claim 24, wherein decoding the symbols at the receiver comprises taking a modulo of each of the symbols so as to recover the corresponding input symbol.

45. A method for conveying digital data from a transmitter to a receiver, comprising:
specifying a spectral filtering profile to be applied in conveying the data, including a transmit filtering profile to be applied by the transmitter;
conveying one or more parameters defining the transmit filtering profile from the transmitter to the receiver;
generating a sequence of input symbols at the transmitter corresponding to the data to be conveyed;
filtering the symbols in accordance with the specified profile;
transmitting the filtered symbols to the receiver over a channel having a given channel response;
adaptively determining equalization coefficients for application by a digital equalizer in the receiver responsive to the channel response, using the parameters conveyed from the transmitter;
applying the digital equalizer to the symbols at the receiver so as to compensate for the channel response; and
decoding the filtered symbols at the receiver so as to recover the data therefrom.

46. A method according to claim 45, and comprising precoding the input symbols at the transmitter using Tomlinson-Harashima precoding responsive to the specified profile, so as to generate a corresponding sequence of precoded symbols, wherein filtering the symbols comprises filtering the precoded symbols.

47. A method according to claim 46, and comprising conveying an indication of the adaptively-determined coefficients to the transmitter, wherein precoding the input symbols comprises adjusting the Tomlinson-Harashima precoding responsive to the indication.

48. A method according to claim 47, wherein decoding the symbols comprises at least partially deactivating the digital equalizer after adjusting the precoding.

49. A method according to claim 48, wherein determining the equalization coefficients comprises refraining from fully filtering the precoded symbols while determining the coefficients.

50. A method according to claim 47, wherein determining the equalization coefficients comprises determining the coefficients while filtering the precoded symbols.

51. A method according to claim 46, wherein generating the sequence of input signals comprises generating the sequence with a given input constellation, and wherein filtering the precoded symbols comprises generating output symbols having an output constellation that is expanded relative to the input constellation, and wherein adaptively determining the equalization coefficients comprises finding a distribution of the output constellation and computing the coefficients responsive to the distribution.

52. A method according to claim 45, wherein applying the digital equalizer comprises applying a forward equalizer and a decision feedback equalizer.

53. A method according to claim 45, wherein conveying the one or more parameters comprises conveying poles and zeroes of the filtering profile.

54. A method according to claim 45, wherein conveying the one or more parameters comprises conveying coefficients of a filter implementing the filtering profile.

55. A method for conveying digital data from a transmitter to a receiver, comprising:
specifying a spectral filtering profile to be applied in conveying the data;
transmitting an initial sequence of symbols from the transmitter to the receiver over a channel having a given channel response;
adaptively determining equalization coefficients for application by a digital equalizer in the receiver responsive to the channel response, as indicated by reception of the initial sequence of the symbols at the receiver;
conveying one or more equalization parameters indicative of the determined equalization coefficients from the receiver to the transmitter;
generating a sequence of input symbols at the transmitter corresponding to the data to be conveyed;
precoding the input symbols at the transmitter using Tomlinson-Harashima precoding responsive to the specified profile and to the parameters conveyed from the receiver, so as to generate a corresponding sequence of precoded symbols;
filtering the precoded symbols in accordance with the specified profile;
transmitting the filtered symbols to the receiver over the channel; and
decoding the filtered symbols at the receiver so as to recover the data therefrom.

56. A method according to claim 55, wherein specifying the spectral filtering profile comprises specifying a transmit filtering profile to be applied by the transmitter and conveying one or more filtering parameters defining the transmit filtering profile from the transmitter to the receiver for use in adaptively determining the equalization coefficients.

57. A method according to claim 55, wherein decoding the symbols comprises at least partially deactivating the digital equalizer after conveying the parameters to the transmitter.

58. A method according to claim 57, wherein determining the equalization coefficients comprises applying a forward equalizer and a decision feedback equalizer and determining the coefficients therefor, and wherein deactivating the equalizer comprises deactivating the decision feedback equalizer.

59. A method according to claim 55, wherein determining the equalization coefficients comprises refraining from filtering the precoded symbols while determining the coefficients.

60. A method according to claim 55, wherein determining the equalization coefficients comprises determining the coefficients while filtering the precoded symbols.

61. A method according to claim 55, wherein generating the sequence of input signals comprises generating the sequence with a given input constellation, and wherein filtering the precoded symbols comprises generating output symbols having an output constellation that is expanded relative to the input constellation, and wherein adaptively determining the equalization coefficients comprises finding a distribution of the output constellation and computing the coefficients responsive to the distribution.

62. A method according to claim 55, wherein conveying the one or more parameters comprises conveying poles and zeroes of a filter used in the equalizer.

63. A method according to claim 55, wherein conveying the one or more parameters comprises conveying coefficients of a filter used in the equalizer.

64. A high-speed data transmitter, comprising:
a Tomlinson-Harashima precoder, which is adapted to receive and precode a sequence of input symbols responsive to a specified infinite impulse response (IIR) spectral filtering profile, so as to generate a corresponding sequence of precoded symbols; and
transmit circuitry, which is adapted to process the precoded symbols so as to generate an output signal for transmission over a communication channel to a receiver,
wherein the specified spectral filtering profile comprises a notch filter response.

65. A transmitter according to claim 64, wherein the transmit circuitry comprises a digital filter, which is adapted to filter the precoded symbols responsive to the notch filter response.

66. A transmitter according to claim 65, wherein the output signal comprises a radio-frequency signal, and wherein the digital filter is adapted to apply the notch filter response so as to attenuate the radio-frequency signal in a predetermined frequency band, so as to avoid generating radio frequency interference in that band.

67. A transmitter according to claim 64, wherein the transmit circuitry is configured to transmit the output stream over a channel having a channel response, and wherein at least a portion of the profile is specified substantially independently of the channel response.

68. A high-speed data transmitter, comprising:
a Tomlinson-Harashima precoder, which is adapted to receive and precode a sequence of input symbols responsive to a specified infinite impulse response (IIR) spectral filtering profile, so as to generate a corresponding sequence of precoded symbols; and
transmit circuitry, which is adapted to process the precoded symbols so as to generate an output signal for transmission over a communication channel to a receiver,
wherein the transmit circuitry is configured to transmit the output stream over a channel having a channel response, and wherein at least a portion of the profile is specified substantially independently of the channel response, and
wherein the precoder and transmit circuitry are further configured to optimize an output power spectral density of the transmitter responsive to the channel response.

69. A transmitter according to claim 64, wherein the transmit circuitry is configured to transmit the output signal over a channel having a given channel response, and wherein the precoder is adapted to precode the input symbols responsive to the channel response, as well as to the specified profile.

70. A transmitter according to claim 64, wherein the precoder comprises:
a feedback digital filter, which is adapted to apply a feedback filter response, based on the specified spectral filtering profile, to the sequence of precoded symbols so as to generate a corresponding sequence of feedback symbols;
a subtractor, adapted to subtract the feedback symbols from the corresponding input symbols, so as to generate a corresponding sequence of subtracted symbols; and
a modulo mapping device, adapted to map the subtracted symbols to the corresponding precoded symbols, such that each of the subtracted symbols in the sequence can be recovered by taking a modulo of the corresponding precoded symbol.

71. A transmitter according to claim 70, wherein the symbols comprise Quadrature Amplitude Modulation (QAM) symbols, having respective real and imaginary parts, and wherein the modulo mapping device is adapted to map both the real and imaginary parts of the subtracted symbols.

72. A transmitter according to claim 70, wherein the IIR spectral filtering profile comprises a definition conveyed to the transmitter of a known filter component used in at least one of the transmitter and the receiver, the filter component having poles, and wherein the feedback digital filter is adapted to apply the feedback filter response based on the poles of the known filter component.

73. A transmitter according to claim 70, wherein the spectral filtering profile is given in the z-domain by $A(z)/B(z)$, A and B complex polynomials, and
wherein the channel has a channel response $H(z)$, and wherein the feedback filter response $F(z)$ is given substantially by $F(z)=[(1+z^{-1} \cdot DFEh(z)) \cdot A(z)-B(z)]/B(z)$,
wherein $DFEh(z)$ is an equalizer response of a decision feedback equalizer that is suitable to compensate for the channel response at the receiver.

74. A transmitter according to claim 70, wherein the specified spectral filtering profile comprises a transmit filtering profile to be applied by the transmitter, and wherein the precoder is adapted to generate interim transmit symbols by applying to the precoded symbols at least a portion of the feedback filter response corresponding to the transmit filtering profile, and wherein the transmit circuit comprises an adder, coupled to add the interim transmit symbols to the precoded symbols so as to generate the output signal in accordance with the transmit filtering profile.

75. A transmitter according to claim 64, wherein the output signal stream comprises Very High Rate Digital Subscriber Line (VDSL) signals.

76. A high-speed data transmitter, comprising:
a Tomlinson-Harashima precoder, which is adapted to receive and precode a sequence of input symbols responsive to a specified spectral filtering profile, including a transmit filtering profile to be applied by the transmitter, so as to generate a corresponding sequence of precoded symbols, the precoder comprising:
a feedback digital filter, which is adapted to apply a feedback filter response, based on the specified spectral filtering profile, to the sequence of precoded symbols so as to generate a corresponding sequence of feedback symbols, at least a portion of the feedback filter response comprising a transmit feedback filter response corresponding to the transmit filtering profile, such that the filter generates interim transmit symbols by applying the transmit feedback filter response to the precoded symbols;
a subtractor, adapted to subtract the feedback symbols from the corresponding input symbols, so as to generate a corresponding sequence of subtracted symbols; and
a modulo mapping device, adapted to map the subtracted symbols to the corresponding precoded symbols, such that each of the subtracted symbols in the sequence can be recovered by taking a modulo of the corresponding precoded symbol; and
transmit circuitry, comprising an adder, coupled to add the interim transmit symbols to the precoded symbols so as to generate the output signal in accordance with the transmit filtering profile for transmission over a communication channel to a receiver.

77. A transmitter according to claim 76, wherein the specified spectral filtering profile comprises a notch filter response.

78. A transmitter according to claim 77, wherein the transmit circuitry requires substantially no digital filter other than the feedback digital filter in order to generate the output signal in accordance with the notch filter response.

79. A transmitter according to claim 77, wherein the output signal comprises a radio-frequency signal, and wherein the feedback digital filter is adapted to apply the notch filter response so as to attenuate the radio-frequency signal in a predetermined frequency band, so as to avoid generating radio frequency interference in that band.

80. A transmitter according to claim 76, wherein the transmit circuitry is configured to transmit the output stream over a channel having a channel response, and wherein at least a portion of the profile is specified substantially independently of the channel response.

81. A transmitter according to claim 80, wherein the feedback digital filter is further configured to optimize an output power spectral density of the transmitter responsive to the channel response.

82. A transmitter according to claim 76, wherein the transmit circuitry is configured to transmit the output signal over a channel having a given channel response, and wherein the precoder is adapted to precode the input symbols responsive to the channel response, as well as to the specified profile.

83. A transmitter according to claim 82, wherein the feedback digital filter comprises a transmit filter section, which generates the interim transmit symbols, and a channel filter section, which is coupled to generate the feedback symbols, responsive to the channel response, in cooperation with the transmit filter section.

84. A transmitter according to claim 76, wherein the spectral filtering profile is substantially identical to the transmit filtering profile, such that the interim transmit symbols are the feedback symbols.

85. A transmitter according to claim 76, wherein the specified spectral filtering profile comprises a transmit filtering profile to be applied by the transmitter, and a receive filtering profile to be applied by the receiver, and wherein the feedback digital filter comprises a transmit filter section, which generates the interim transmit symbols, and a receive filter section, which is coupled to generate the feedback symbols responsive to the receive filtering profile, in cooperation with the transmit filter section.

86. A transmitter according to claim 76, wherein the symbols comprise Quadrature Amplitude Modulation (QAM) symbols, having respective real and imaginary parts, and wherein the modulo mapping device is adapted to map both the real and imaginary parts of the subtracted symbols.

87. A transmitter according to claim 76, wherein the spectral filtering profile comprises a definition conveyed to the transmitter of a known filter component used in at least one of the transmitter and the receiver, the filter component having poles, and wherein the feedback digital filter is adapted to apply the feedback filter response based on the poles of the known filter component.

88. A transmitter according to claim 76, wherein the spectral filtering profile is given in the z-domain by $A(z)/B(z)$, A and B complex polynomials, and
wherein the channel has a channel response $H(z)$, and wherein the feedback filter response $F(z)$ is given substantially by $F(z)=[(1+z^{-1} \cdot DFEh(z)) \cdot A(z)-B(z)]/B(z)$, wherein DFEh(z) is an equalizer response of a decision feedback equalizer that is suitable to compensate for the channel response at the receiver.

89. A transmitter according to claim 76, wherein the output signal stream comprises Very High Rate Digital Subscriber Line (VDSL) signals.

90. A transmitter according to claim 76, wherein the spectral filtering profile is given in the z-domain by F(z), and wherein the feedback digital filter is adapted to generate the interim transmit symbols by applying an interim filter response to the precoded symbols that is given substantially by $G(z)=[F(z)-1]/z^{-1}$.

91. A high-speed data transmitter, comprising:
 a Tomlinson-Harashima precoder, which is adapted to receive and precode a sequence of input symbols responsive to a specified spectral filtering profile, including a transmit filtering profile to be applied by the transmitter, so as to generate a corresponding sequence of precoded symbols, the precoder comprising:
  a feedback digital filter, which is adapted to apply a feedback filter response, based on the specified spectral filtering profile, to the sequence of precoded symbols so as to generate a corresponding sequence of feedback symbols, at least a portion of the feedback filter response comprising a transmit feedback filter response corresponding to the transmit filtering profile, such that the filter generates interim transmit symbols by applying the transmit feedback filter response to the precoded symbols;
  a subtractor, adapted to subtract the feedback symbols from the corresponding input symbols, so as to generate a corresponding sequence of subtracted symbols; and
  a modulo mapping device, adapted to map the subtracted symbols to the corresponding precoded symbols, such that each of the subtracted symbols in the sequence can be recovered by taking a modulo of the corresponding precoded symbol; and
 transmit circuitry, coupled to combine the interim transmit symbols with the precoded symbols so as to generate the output signal in accordance with the transmit filtering profile for transmission over a communication channel to a receiver, the transmit circuitry comprising substantially no digital filter other than the feedback digital filter in order to generate the output signal in accordance with the transmit filtering profile.

92. A transmitter according to claim 91, wherein the specified spectral filtering profile comprises a notch filter response.

93. Apparatus for high-speed data transmission, comprising:
 a transmitter, which comprises:
  a Tomlinson-Harashima precoder, which is adapted to receive and precode a sequence of input symbols responsive to a specified spectral filtering profile, so as to generate a corresponding sequence of precoded symbols; and
  transmit circuitry, which is adapted to process the precoded symbols so as to generate an output signal for transmission over a communication channel; and
 a receiver, adapted to receive the output signal from the transmitter over the channel, and comprising:
  receive circuitry, which is adapted to process the received output signal, so as to generate a stream of output samples;
  a decision block, comprising a digital equalizer adapted to process the stream of output samples so as to recover a sequence of output symbols, based on information regarding the specified spectral filtering profile exchanged between the transmitter and the receiver; and
  a modulo reduction device, adapted to take a modulo of each of the recovered output symbols so as to regenerate the input symbols.

94. Apparatus according to claim 93, wherein the specified spectral filtering profile comprises a notch filter response.

95. Apparatus according to claim 93, wherein at least one of the transmit circuitry and the receive circuitry comprises a digital filter, which is adapted to apply the specified filtering profile to the signal.

96. Apparatus according to claim 95, wherein the digital filter comprises a transmit digital filter in the transmit circuitry and a receive digital filter in the receive circuitry, which are together adapted to apply the specified filtering profile.

97. Apparatus according to claim 95, wherein the digital filter comprises a transmit digital filter in the transmit circuitry, the filter having filter parameters, and wherein the transmitter is adapted to transmit the filter parameters to the receiver for use in processing the output samples.

98. Apparatus according to claim 97, wherein the filter parameters transmitted by the transmitter comprise poles and zeroes of the transmit digital filter.

99. Apparatus according to claim 97, wherein the filter parameters transmitted by the transmitter comprise coefficients of the transmit digital filter.

100. Apparatus according to claim 95, wherein the digital filter comprises a receive digital filter in the receive circuitry, the filter having filter parameters, and wherein the receiver is adapted to transmit the filter parameters to the transmitter for use in precoding the input symbols.

101. Apparatus according to claim 100, wherein the filter parameters transmitted by the receiver comprise poles and zeroes of the receive digital filter.

102. Apparatus according to claim 100, wherein the filter parameters transmitted by the receiver comprise coefficients of the receive digital filter.

103. Apparatus according to claim 93, wherein the communication channel has a channel response, and wherein at least a portion of the profile is specified substantially independently of the channel response.

104. Apparatus according to claim 93, wherein the communication channel has a channel response, and wherein the precoder is adapted to precode the input symbols responsive to the channel response, as well as to the specified filtering profile.

105. Apparatus according to claim 93, wherein the output signal comprises a Very High Rate Digital Subscriber Line (VDSL) signal.

106. Apparatus according to claim 93, wherein the precoder comprises:
 a feedback digital filter, which is adapted to apply a feedback filter response, based on the specified spectral filtering profile, to the sequence of precoded symbols so as to generate a corresponding sequence of feedback symbols;
 a subtractor, adapted to subtract the feedback symbols from the corresponding input symbols, so as to generate a corresponding sequence of subtracted symbols; and
 a modulo mapping device, adapted to map the subtracted symbols to the corresponding precoded symbols, such that each of the subtracted symbols in the sequence can be recovered by taking a modulo of the corresponding precoded symbol.

107. Apparatus according to claim 106, wherein the feedback digital filter comprises an infinite impulse response (IIR) filter.

108. Apparatus according to claim 107, wherein the spectral filtering profile comprises a definition of a known filter component used in at least one of the transmitter and the receiver, the filter component having poles, and wherein the feedback digital filter is adapted to apply the feedback filter response based on the poles of the known filter component.

109. Apparatus according to claim 107, wherein the digital equalizer comprises a decision feedback equalizer (DFE), having an IIR filter structure.

110. Apparatus according to claim 106, wherein the spectral filtering profile is given in the z-domain by $A(z)/B(z)$, A and B complex polynomials, and wherein the channel has a channel response $H(z)$, and wherein the feedback filter response $F(z)$ is given substantially by $F(z)=[(1+z^{-1}\cdot DFEh(z))\cdot A(z)-B(z)]/B(z)$, wherein $DFEh(z)$ is an equalizer response of a decision feedback equalizer that is suitable to compensate for the channel response at the receiver.

111. Apparatus according to claim 110, wherein the decision feedback equalizer is comprised in the decision block of the receiver and is configured to adaptively determine the response $DFEh(z)$, and wherein the receiver is adapted to convey to the transmitter an indication of the determined response $DFEh(z)$ for application by the feedback filter.

112. Apparatus according to claim 106, wherein the decision block comprises:

a decision feedback equalizer, which is configured to apply decision feedback filtering to the recovered sequence of output symbols, so as to generate a corresponding sequence of decision feedback symbols;

a forward filter equalizer, which is configured to apply forward equalization to the stream of output samples so as to generate a sequence of forward-equalized symbols;

an adder, adapted to add the decision feedback symbols to the forward-equalized symbols to generate a corresponding sequence of corrected symbols; and an extended slicer, adapted to assign each of the corrected symbols to a corresponding value in a constellation of the output symbols.

113. Apparatus according to claim 112, wherein the decision feedback equalizer comprises an adaptive equalizer, having equalization coefficients determined adaptively responsive to the channel response.

114. Apparatus according to claim 113, wherein the receiver is adapted to convey to the transmitter an indication of the equalization coefficients, responsive to which the feedback filter response is determined so that the precoder precodes the input symbols based on the channel response, as well as on the specified profile.

115. Apparatus according to claim 114, wherein after the indication of the equalization coefficients is conveyed to the transmitter, the decision feedback equalizer is at least partially disabled.

116. Apparatus according to claim 114, wherein the equalization coefficients are determined based on the information regarding the specified spectral filtering profile.

117. Apparatus according to claim 114, wherein the equalization coefficients are determined in a start-up procedure of the apparatus, during which at least a portion of the specified spectral filtering profile is deactivated.

118. Apparatus according to claim 114, wherein the equalization coefficients are determined in a start-up procedure of the apparatus, during which the precoder is deactivated.

119. Apparatus according to claim 93, wherein the digital equalizer is adapted to process the stream of output samples based on known characteristics of at least a portion of the spectral filtering profile that is applied to the signal by the transmitter.

120. Apparatus according to claim 93, wherein the digital equalizer is adapted to process the stream of output samples based on known characteristics of at least a portion of the spectral filtering profile that is applied to the signal by the receiver.

* * * * *